(12) United States Patent
Lovemelt et al.

(10) Patent No.: US 10,560,645 B2
(45) Date of Patent: Feb. 11, 2020

(54) IMMERSIVE VIDEO ENVIRONMENT USING NEAR-INFRARED VIDEO COMPOSITING

(71) Applicant: Feedback, LLC, Minneapolis, MN (US)

(72) Inventors: Hamilton Lovemelt, Minneapolis, MN (US); Geoffrey Schuler, Minneapolis, MN (US)

(73) Assignee: FEEDBACK, LLC, Minneapolis, MN (US)

( * ) Notice: Subject to any disclaimer, the term of this patent is extended or adjusted under 35 U.S.C. 154(b) by 69 days.

(21) Appl. No.: 15/713,067

(22) Filed: Sep. 22, 2017

(65) Prior Publication Data

US 2019/0098230 A1   Mar. 28, 2019

(51) Int. Cl.
*H04N 5/225* (2006.01)
*H04N 5/33* (2006.01)
*H04N 5/262* (2006.01)

(52) U.S. Cl.
CPC ........... *H04N 5/332* (2013.01); *H04N 5/2251* (2013.01); *H04N 5/2624* (2013.01)

(58) Field of Classification Search
CPC ..... H04N 5/332; H04N 5/2251; H04N 5/2624
USPC ....................................................... 348/146
See application file for complete search history.

(56) References Cited

U.S. PATENT DOCUMENTS

| | | | |
|---|---|---|---|
| 5,923,469 | A | 7/1999 | Machtig et al. |
| 5,940,139 | A | 8/1999 | Smoot |
| 6,042,235 | A | 3/2000 | Machtig et al. |
| 6,545,803 | B1 | 4/2003 | Sakuma et al. |
| 6,685,326 | B2 | 2/2004 | Debevec et al. |
| 6,834,968 | B2 | 12/2004 | Peatross et al. |

(Continued)

FOREIGN PATENT DOCUMENTS

WO   WO-2015139625 A1   9/2015

OTHER PUBLICATIONS

Davis et al., "SIDEshow: A Silhouette-based Interactive Dual-screen Environment", 1998, M.I.T, Media Laboratory Perceptual Computing Section Technical Report No. 457—Vision and Modeling Group, 5 pages (Year: 1998).*

(Continued)

*Primary Examiner* — Christopher S Kelley
*Assistant Examiner* — Asmamaw G Tarko
(74) *Attorney, Agent, or Firm* — Schwegman Lundberg & Woessner, P.A.

(57) ABSTRACT

Various methods and systems are disclosed for near-infrared video compositing techniques and an associated immersive video environment. In an example, a video environment includes: a visible light camera and an infrared detection camera arranged to capture video from a performance area; a visible light source and infrared light source arranged to emit visible light onto the performance area; a display source to provide video output; and a display screen arranged in the performance area between the camera system and the infrared light source. The display screen is further arranged to reflect visible light originating from the display source, while permitting infrared and visible light from the performance area to reach the cameras. In a further example, the system includes a backdrop integrating the infrared light source, as infrared light from the infrared light source passes through the backdrop into the performance area.

20 Claims, 22 Drawing Sheets

(56) References Cited

U.S. PATENT DOCUMENTS

| | | | |
|---|---|---|---|
| 7,042,486 B2 | 5/2006 | Manico et al. | |
| 7,044,613 B2 | 5/2006 | Debevec | |
| 7,436,403 B2 | 10/2008 | Debevec | |
| 7,599,555 B2 | 10/2009 | McGuire et al. | |
| 8,022,977 B2 | 9/2011 | Kanade et al. | |
| 8,300,234 B2 | 10/2012 | Debevec et al. | |
| 8,319,797 B2 | 11/2012 | Swanson et al. | |
| 8,390,671 B2 | 3/2013 | Kanade et al. | |
| 8,462,192 B2 | 6/2013 | O'Connell | |
| 8,508,614 B2 | 8/2013 | Segal | |
| 8,824,861 B2 | 9/2014 | Gentile et al. | |
| 8,867,835 B2 | 10/2014 | Flagg et al. | |
| 8,885,066 B2 | 11/2014 | Rindfuss et al. | |
| 8,928,735 B2 | 1/2015 | Junuzovic et al. | |
| 8,981,966 B2 | 3/2015 | Stein et al. | |
| 8,988,599 B2 | 3/2015 | Debevec et al. | |
| 9,064,318 B2 | 6/2015 | Price et al. | |
| 9,094,615 B2 | 7/2015 | Aman et al. | |
| 9,123,172 B2 | 9/2015 | Sebring et al. | |
| 9,124,762 B2 | 9/2015 | Cutler et al. | |
| 9,191,643 B2 | 11/2015 | Sweeney et al. | |
| 9,280,034 B2 | 3/2016 | Libreri et al. | |
| 9,288,462 B2 | 3/2016 | Vlahos et al. | |
| 9,311,901 B2 | 4/2016 | Webster et al. | |
| 9,348,134 B2 | 5/2016 | Ichii | |
| 9,355,325 B2 | 5/2016 | Vonolfen et al. | |
| 2009/0058805 A1 | 3/2009 | Groves et al. | |
| 2010/0158379 A1* | 6/2010 | Hatfield | G06T 11/60 382/190 |
| 2010/0302376 A1* | 12/2010 | Boulanger | H04N 5/332 348/164 |
| 2013/0191287 A1 | 7/2013 | Gainer, III et al. | |
| 2013/0300637 A1 | 11/2013 | Smits et al. | |
| 2013/0335505 A1* | 12/2013 | O'Connell | G03B 15/02 348/14.07 |
| 2014/0063469 A1* | 3/2014 | Folcik | G03B 21/10 353/79 |
| 2014/0306995 A1 | 10/2014 | Raheman et al. | |
| 2014/0307056 A1 | 10/2014 | Collet Romea et al. | |
| 2015/0138303 A1 | 5/2015 | White | |
| 2015/0271406 A1 | 9/2015 | Cerny | |
| 2015/0348326 A1 | 12/2015 | Sanders et al. | |
| 2016/0004302 A1* | 1/2016 | Bolle | G06F 3/013 348/14.08 |
| 2016/0048991 A1 | 2/2016 | Vlahos | |
| 2018/0249910 A1* | 9/2018 | Zhang | H04N 5/2254 |

OTHER PUBLICATIONS

"Gravity: TouchDesigner Works in Zero-G", Derivative, [Online]. Retrieved from the Internet: <URL: http://www.derivative.ca/Events/2014/Gravity, (Accessed Aug. 10, 2016), 10 pgs.

Alexander, Oleg, et al., "Creating a Photoreal Digital Actor: The Digital Emily Project", SIGGRAPH 2009 Course Notes: The Digital Emily Project, (2009), 1-15.

Bennett, Eric P., et al., "Multispectral Bilateral Video Fusion", IEEE Transactions on Image Processing, vol. 16, No. 5, (May 2007), 1185-1194.

Bhattarai, Sabin, et al., "Programming camera and lighting systems for controlled reflectance acquisition", Imperial College London, (Jun. 16, 2015), 1-112.

Bilodeau, G. A., et al., "Visible and infrared image registration using trajectories and composite foreground images", Image and Vision Computing 29, (2011), 41-50.

Davis, James W., et al., "SIDEshow: A Silhouette-based Interactive Dual-screen Enviornrnent", M.I.T. Media Laboratory Perceptual Computing Section Technical Report No. 457—Vision and Modeling Group, (1998), 5 pgs.

Debevec, Paul, et al., "A Lighting Reproduction Approach to Live-Action Compositing", SIGGRAPH 2002, San Antonio, (2002), 1-10.

Debevec, Paul, "The Light Stages and Their Applications to Photoreal Digital Actors", (2012), 4 pgs.

Einarsson, PER, et al., "Relighting Human Locomotion with Flowed Reflectance Fields", Eurographics Symposium on Rendering (2006), (2006), 12 pgs.

Fredembach, Clement, et al., "Combining visible and near-infrared images for realistic skin smoothing", School of Computer and Communication Sciences, Ecole Polytechnique F'ed'erale de Lausanne (EPFL), Lausanne, Switzerland, (2009), 6 pgs.

Hedili, M. Kivanc, et al., "Transmission characteristics of a bidirectional transparent screen based on reflective microlenses", Optics Express, vol. 21, No. 21, (Oct. 8, 2013), 11 pgs.

Hong, Keehoon, et al., "Two-dimensional and three-dimensional transparent screens based on lens-array holographic optical elements", Optics Express, vol. 22, No. 12, (Jun. 4, 2014), 12 pgs.

Kravetz, Adam M., "Polyhedral Hull Online Compositing System: Texturing and Reflections", Masters of Science thesis—Cornell University, (2005), 105 pgs.

Legendre, Chloe, et al., "Practical Multispectral Lighting Reproduction", SIGGRAPH 2016 Technical Papers 2016, (2016), 11 pgs.

Lindsay, Clifford, "Programmable Image-Based Light Capture for Previsualization", Computer Science Dissertation—Worcester Polytechnic Institute, (Jan. 31, 2013), 246 pgs.

Masselus, Vincent, et al., "Relighting with 4D Incident Light Fields", Department of Computer Science—Katholieke Universiteit Leuven, (2003), 8 pgs.

Qian, Xiaoyan, et al., "An object tracking method based on local matting for night fusion image", Infrared Physics & Technology 67, (2014), 455-461.

Salamati, Neda, et al., "Combining Visible and Near-Infrared Cues for Image Categorisation", (2011), 11 pgs.

Seymour, Mike, "The Art of Digital Faces at ICT—Digital Emily to Digital Ira", [Online]. Retrieved from the Internet: <URL: https://www.fxguide.com/featured/the-art-of-digital-faces-at-ict-frorn-digital-emily-to-digital ira, (Nov. 25, 2013), 73 pgs.

Süsstrunk, Sabine, et al., "8-1: Invited Paper: Enhancing the Visible with the Invisible: Exploting Near-Infrared to Advance Computational Photography and Computer Vision", SID International Symposium Digest, 2010, (2010), 4 pgs.

Tan, Desney S., et al., "Pre-emptive Shadows: Eliminating the Blinding Light from Projectors", School of Computer Science, Carnegie Mellon University, (Jan. 2002), 2 pgs.

Teng, Dongdong, et al., "Generation of 360° three-dimensional display using circular-aligned OLED microdisplays", Optics Express, vol. 23, No. 3, (Jan. 26, 2015), 12 pgs.

Theobalt, Christian, et al., "High-Quality Reconstruction from Multiview Video Streams—[Dynamic representation of 3-D human actors", IEEE Signal Processing Magazine, (Nov. 2007), 45-57.

Vidor, Zoli, "An Infrared Self-Matting Process", Journal of the SMPTE, vol. 69, (Jun. 1960), 425-427.

Yasuda, Kazutaka, et al., "Thermo-Key: Human Region Segmentation from Video", Emerging Technologies, (Feb. 2004), 26-30.

Zhang, Qiong, et at, "An adaptive fusion approach for infrared and visible images based on NSCT and compressed sensing", Infrared Physics & Technology 74, (2016), 11-20.

Zin, Thi Thi, et al., "Fusion of Infrared and Visible Images for Robust Person Detection", [Online]. Retrieved from the Internet: <URL: www.intechopen.com, (2011), 239-264.

"U.S. Appl. No. 15/713,057, Notice of Allowance dated Dec. 12, 2018", 8 pgs.

* cited by examiner

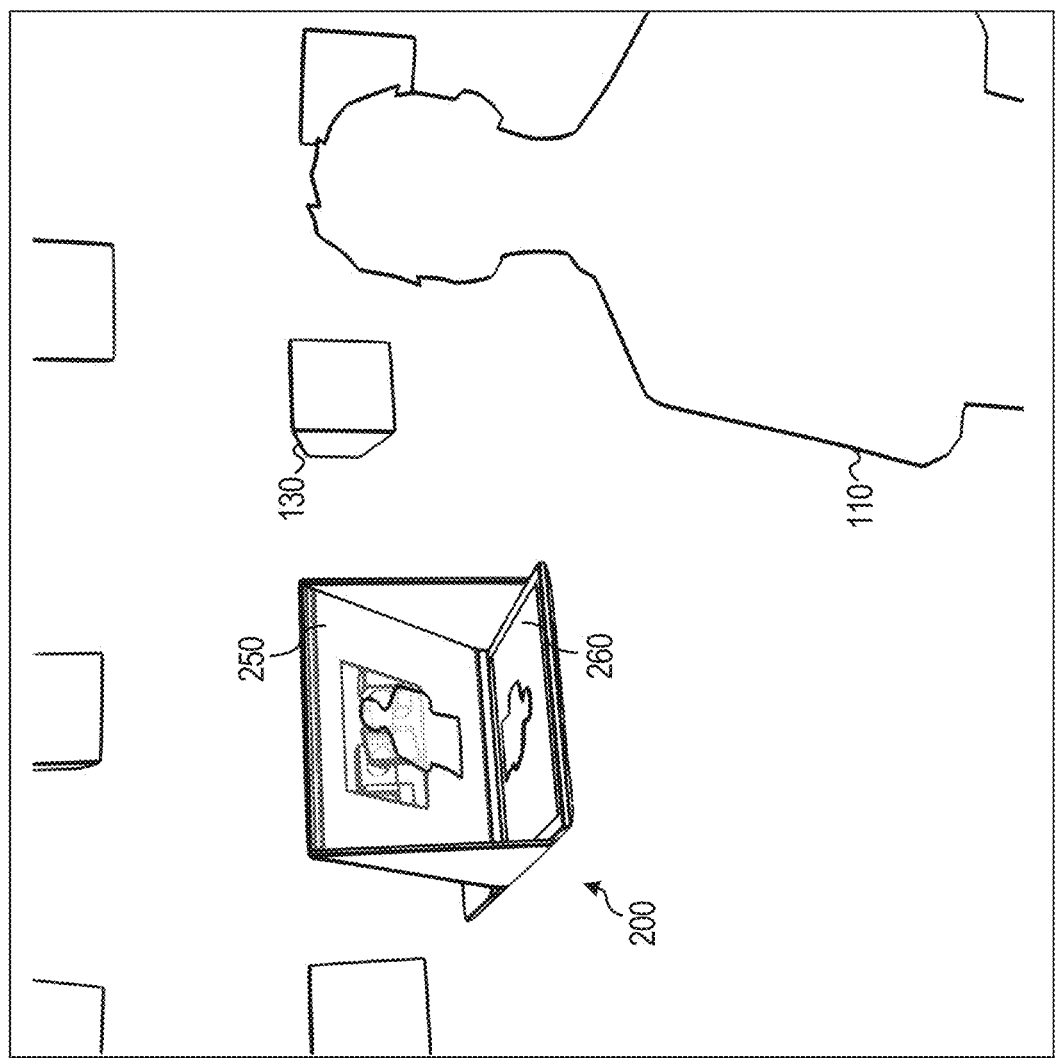

IMMERSIVE VIDEO ENVIRONMENT USING NEAR-INFRARED VIDEO COMPOSITING

RELATED APPLICATIONS

The subject matter of the present application is related to U.S. patent application Ser. No. 15/713,057 to Lovemelt et al., titled NEAR-INFRARED VIDEO COMPOSITING, and filed Sep. 22, 2017, the contents of which are incorporated by reference herein in their entirety.

TECHNICAL FIELD

Embodiments described herein generally relate to video processing and visual effect techniques and environments, and in particular, but not by way of limitation, to systems, methods, and accompanying embodiments involving compositing video from visible light and near-infrared cameras, and providing outputs from such composited video in an interactive environment.

BACKGROUND

A variety of techniques are currently used for the creation and manipulation of video post-production effects. One common technique involves the use of chroma key compositing, which composites (layers) two or more images or video streams based on color hues. A well-known example of this type of video effect is used in many television news productions, which superimpose a human presenter who is captured in front of a chroma key screen (e.g., a "green screen") over a computer-generated weather map or other computer-generated content. Another common technique for compositing involves the use of visible background subtraction, which is performed after calculating the color distance between a known background image and an input video stream. With the background content removed, the video stream can then be composited with other video content.

These and similar video compositing techniques involve the use and processing of visible information to identify the boundaries between desired and undesired video content. Unfortunately, the effects from such compositing techniques may be distorted or unreliable during uneven lighting or incorrect camera exposure conditions. These compositing techniques are also imprecise and often experience difficulty in tracking movement. As a result, chroma key compositing and background subtraction are unable to be cleanly used in many low-light and real world settings.

Limited techniques have been proposed for the use of infrared video compositing to segment video content without being restricted by the limitations of visible light as described above. For instance, a 1960 paper published by Zoli Vidor, "*An Infrared Self-Matting Process*", discusses the use of compositing through an infrared traveling matte process, provided from visible and infrared light exposures captured on separate sets of film. The applicability of the Vidor technique, however, is limited due to the use of a specialized camera and the complexity of film-based processing. A more recent example, a 2002 paper published by Paul Debevec et al., "*A Lighting Reproduction Approach to Live-Action Compositing*", discusses the use of live-action matting and compositing with digital video with use of near-infrared light. However, the Debevec paper emphasizes the use of a near-infrared camera within a specialized light stage for the purpose of replicating lighting special effects from complex motion picture scenes. As a result, infrared video compositing has only been applied in limited settings, such as in complex and artificial video capture stages or research environments.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings, in which:

FIG. 6 illustrates video capture and output from the near-infrared video compositing camera system used with in a video teleprompter system, according to an example;

DETAILED DESCRIPTION

Figure 1A:
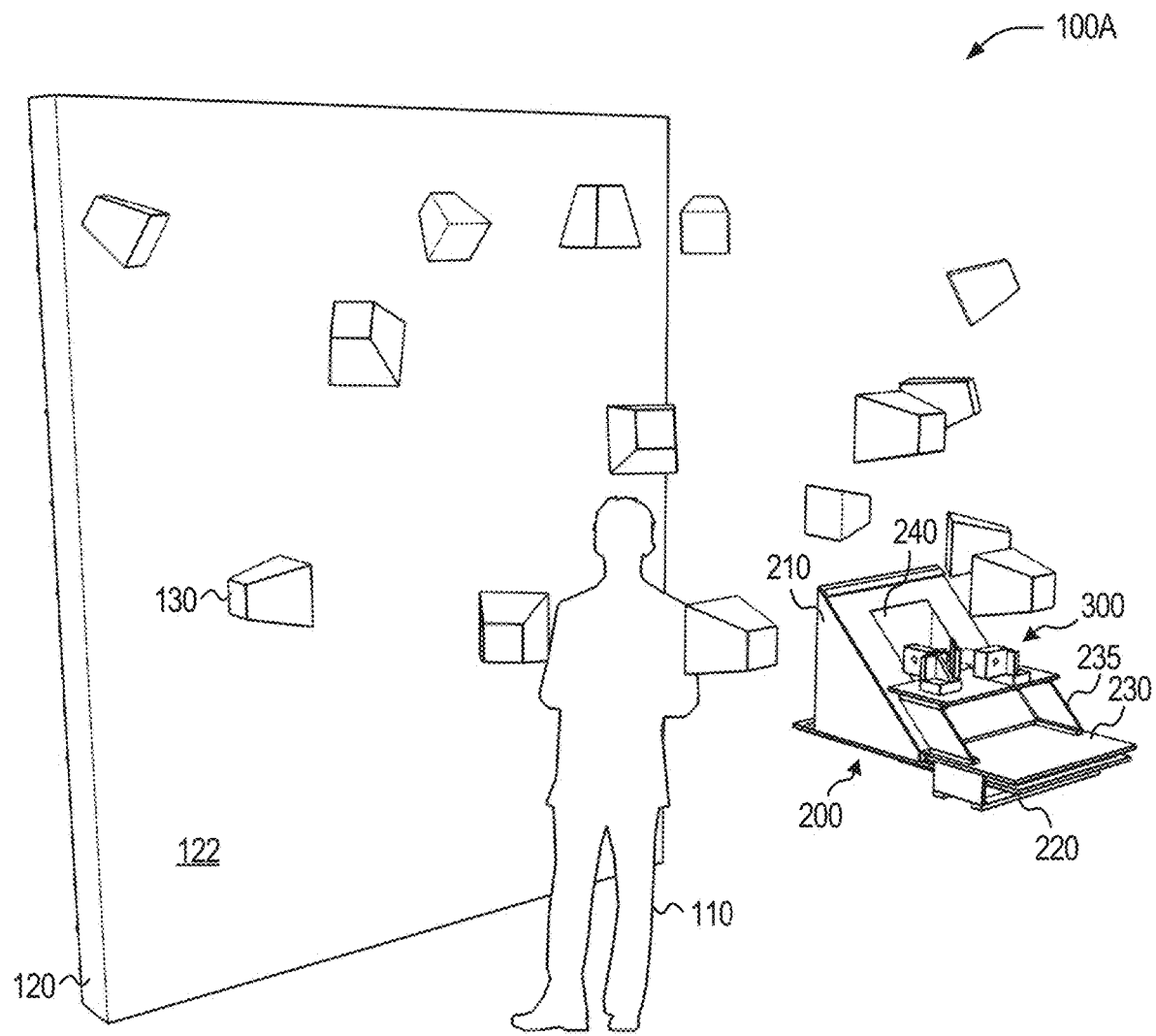
FIGS. 1A-1C illustrate side and front views of an environment for capturing video of a subject using a near-infrared video compositing camera system, according to an example.

In the following description, for purposes of explanation, numerous specific details are set forth in order to provide a thorough understanding of some example embodiments. It will be evident, however, to one skilled in the art that aspects of the present disclosure may be practiced without these specific details.

In various examples described herein, an interactive video processing system utilizing features of infrared video compositing is arranged to create a matte. In an example, the interactive video processing system includes use of a dual camera system, including a near-infrared camera and a visible light camera arrangement to provide dual video feeds of a common field of view to a digital video processing system. Accompanying processing methods are used to extract a matte from the dual video feeds, composite the matte with other video content, and select and apply additional video post-processing effects (as applicable).

In an example, the interactive video processing system is utilized with aspects of a video input/output display system that provides immediate feedback to a human user in the form of a real-time video display. In an example, the video input/output display system is embodied within features of a specialized teleprompter that is viewable by a human user. The specialized teleprompter may include the dual camera system arranged behind a teleprompter display to capture video from a subject area while also projecting the real-time video display to the subject area. In another example, the video input/output apparatus is embodied with features of a specialized projection screen. The specialized projection screen may include a reflective material that allows a video projection of the human user to be displayed to the subject area, while allowing the dual camera system to capture light from the subject area through the specialized projection screen.

In an example, the interactive video processing system is utilized with aspects of an interactive video stage, embodied by a video booth, video capture unit, or similar performance area. This interactive video stage may be designed to provide users with a unique video experience that can capture a performance, display the performance, and produce digital recorded content, in real-time. As discussed herein, this interactive video stage may be used with features of the interactive video processing system (e.g., a computing system controlling inputs and outputs with the specialized teleprompter or specialized projection screen) to provide an intuitive environment for high speed video capture and real-time video manipulation, while offering robust lighting capabilities in a dynamic compositing framework. In further examples, the interactive video processing system may control aspects of additional post-processing and environment special effects relating to video, sound, light, smoke, wind, or other aspects. Accordingly, the interactive video processing system may offer robust capacities suitable for advanced video art installations within a variety of environments such as museums, galleries, clubs, or experiential marketing locations.

As discussed above, existing approaches for segmentation of a human user and real-world objects in video are based on chroma keying, background subtraction, and like post-processing techniques. These techniques are often not suitable for use in real-world settings beyond complex or expensive video stages. The interactive video stage configuration discussed herein provides an alternative to traditional green screen video stages, to allow a near-infrared video compositing camera to accurately capture a matte in darkness or dynamic lighting situations. The interactive video stage configuration may be embodied by an enclosure or structure that hosts the near-infrared video compositing camera system and allows real-time playback and output on a display screen. Further, the near-infrared video compositing camera system may be located within the interactive video stage configuration in such a manner to allow the display and capture of video from a common area, thus providing a more intuitive and easy to use environment than many conventional uses of video monitors and video booths where the display screen and cameras are displaced from one another.

As discussed herein, the present systems and techniques for infrared video compositing, human and object segmentation, and video capture and processing are applicable to a variety of professional and informal (and public and private) environments. As such, the present systems and techniques are not limited to the specific interactive video stage or dual camera configurations discussed herein. Further, it will be apparent that the many of the illustrated and described arrangements of the components, such as the camera systems, display screens, lighting sources, and special effects sources (e.g., surround or directional sounds, smoke, lasers, strobe lights, wind machines, fans) described herein may be modified, operated, and rearranged without departing from the inventive concepts for the use of infrared video compositing.

As also discussed herein, numerous references are made to "visible" light and "infrared" or "near-infrared" light. References to "visible" light are intended to refer to human-visible wavelengths of light (e.g., within the wavelength range between 400-700 nanometers (nm)), which are captured by visible light sensors of an appropriately configured digital camera. References to "infrared" and "IR" are intended to refer to human-invisible wavelengths of light (e.g., within the wavelength range between 700 nm to 1 millimeters (mm)) extending beyond the visible light range, which are captured by infrared light sensors of an appropriately configured camera. Specifically, such infrared light sensors are typically capable of identifying "near-infrared" light, in a smaller sub-division of the infrared light band, such as located between 700 nm-1000 nm. The following references that are to "infrared", "IR", "near-infrared" and "NIR" refer interchangeably to such near-infrared light in the infrared wavelength range that is perceivable by infrared light sensors. In an example, references that are made herein to "visible" may refer to light in the visible light range that is perceivable by visible light sensors. In an example, a visible light detector and an infrared light detector can detect overlapping frequencies of light. Similarly, references to "visible light" can include a spectrum of light that can include light extending into the infrared range. For example, a visible light source may emit visible and (possibly incidentally) infrared light, such as near red infrared light. In some examples, an infrared light source does not emit visible light.

Figure 1B:
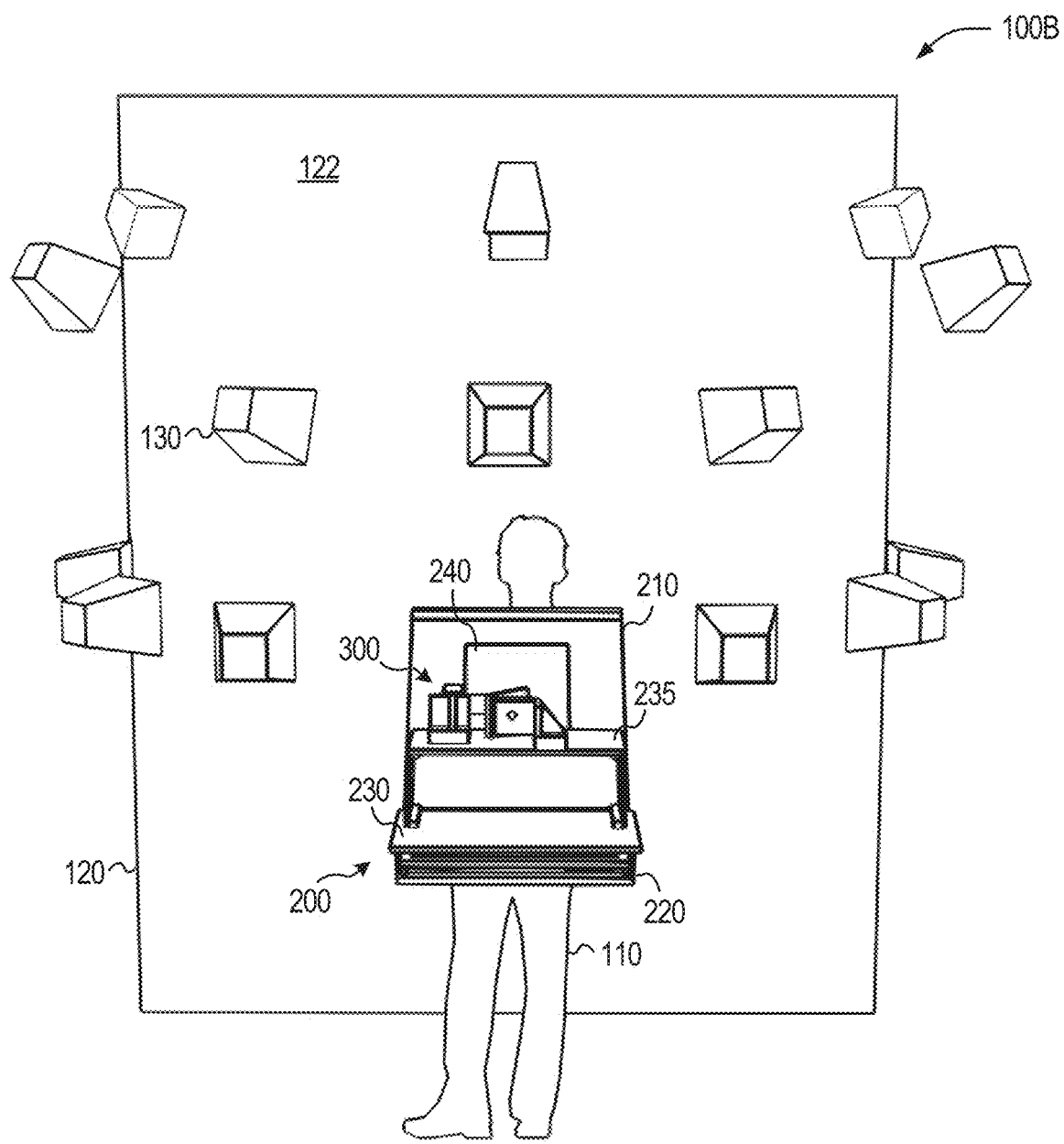
Figure 1C:
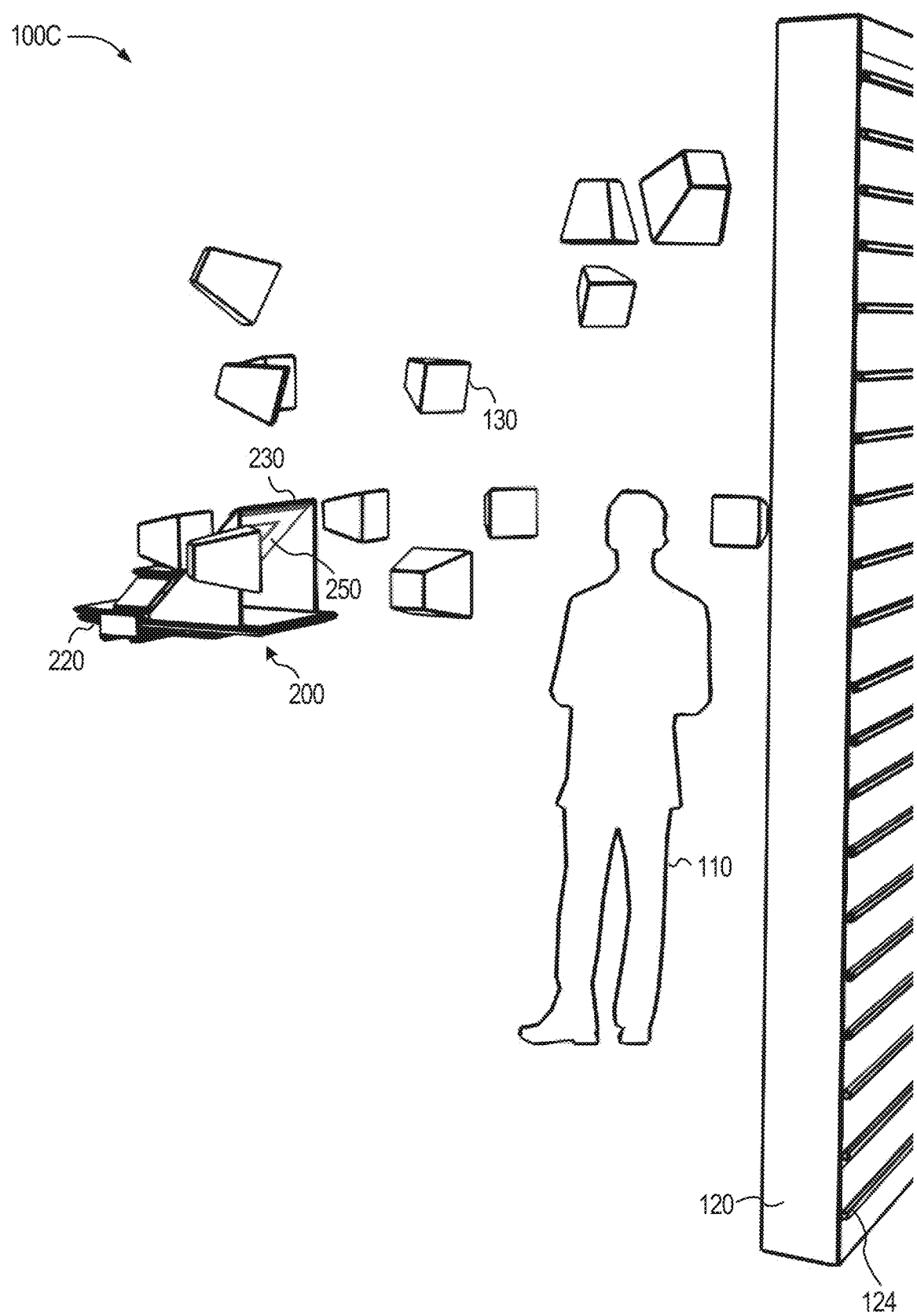

FIGS. 1A-1C illustrate side and front views of an example environment for capturing video of a subject using a NIR video compositing camera system. Specifically, FIG. 1A depicts a perspective view 100A of a video capture environment, having one or more objects (specifically, a human user 110) located within a field of view of a set of cameras hosted in a specialized teleprompter video display system 200. A specific configuration and layout of a structure used to host the video capture environment is further detailed below with reference to FIGS. 2A-2E.

The teleprompter video display system 200 includes a dual camera system 300 arranged to capture IR and visible light video from the field of view. The dual camera system 300 is used to produce respective streams of IR and visible light video, as discussed herein, for creating a matte of the human user 110 and any other objects (including other human users) within the field of view. A specific configuration and layout of the teleprompter video display system 200 is further detailed below with reference to FIGS. 3A-3C. Additional description of the arrangement of the camera system 300 is provided in U.S. patent application Ser. No. 15/713,057 to Hal Lovemelt et al., filed Sep. 22, 2017, and titled NEAR-INFRARED VIDEO COMPOSITING, which is incorporated by reference in its entirety. In another example, a video projection system 400 may be substituted for the teleprompter video display system 200 as shown and described with reference to FIGS. 4A-4C. As will be apparent from the following examples, a variety of projection and camera capture mediums and arrangements may be utilized to capture the field of view with use of the dual camera system 300.

As depicted in FIGS. 1A-1C, the human user 110 is located between the teleprompter video display system 200 and a backdrop 120, and the human user 110 is able to move into, within, and out of a field of view between the backdrop 120 and the teleprompter video display system 200. A set of one or more lights 130 are located in the environment to illuminate visible light (e.g., white light, or colored lights) on the field of view to be captured by the cameras. For example, the lights 130 may be suspended within a light stage or other structure (not shown), to allow visible light to be illuminated on human user 110 and other objects. Only one of the lights 130 in FIGS. 1A-1C is labeled for simplicity; the number, position, orientation of the lights 130 may vary significantly depending on the size of the field of view, the environment, the stage or structure, the shape and size of the lights, and like factors. Further, the lights 130 may include various electric or electronic controls to incorporate dynamic lighting angles, color palettes, or light effects.

The backdrop 120 may provide a boundary or other physical definition for one or more areas of the field of view. In an example, the surface 122 of the backdrop 120 that is visible in the field of view by the dual camera system 300 may provide a dark or other high-contrast background (e.g., black, or dark gray) to absorb visible light. In a specific example, the backdrop is a black masking fabric that appears a solid black to a RGB camera, but which allows IR light to be shined through the fabric to provide IR glow diffusion that is detectable by a NIR camera.

In an example, the backdrop 120 is positioned relative to an IR light source to allow IR light to be emitted into the field of view through a visible surface 122 of the backdrop 120. In a further example, the surface 122 of the backdrop 120 is provided from a fabric material that permits IR light to pass through (from the backdrop 120 towards the teleprompter video display system 200 and the dual camera system 300), while the material of the surface 122 absorbs visible light, or significantly reduces the reflection of visible light, from the lights 130 or other lighting sources.

As discussed in the examples below, the dual camera system 300 and an accompanying video processing system may be adapted to detect objects in the field of view using rear IR illumination that establishes a silhouette of the objects in the field of view. In other examples not depicted in the drawings, the backdrop 120 may be alternatively or additionally illuminated by projecting light from within the field of view towards the backdrop 120. Further, the techniques discussed herein may be adapted for front or side IR illumination, or other variations to IR matting.

In an example, the teleprompter video display system 200 includes a teleprompter housing 210 and a display source 220, with the display source 220 arranged to output a projection onto a two-way display screen within the housing 210 (e.g., to project onto a two-way display screen 250, depicted in the perspective of FIG. 1C). The two-way display screen 250 is positioned within the housing 210 to reflect light from the display source 220 projected at a first angle, while allowing light entering the housing 210 from a second angle to reach the cameras (e.g., to be visible to the dual camera system 300). In an example, the display source 220 may be provided from a monitor, projector, or other light-emitting source, and is positioned on a rear end of the teleprompter video display system 200. The teleprompter video display system 200 may utilizes one or more mirrors to reflect and project the light emitted from the display source 220 onto the two-way display screen 250. In another example, the display source 220 may be positioned directly under the two-way display screen, to directly project the light onto the two-way display screen 250. A variety of other arrangements and materials utilized by existing forms of teleprompters and video monitors may be integrated or adapted into the teleprompter video display system 200.

The two-way display screen 250 allows light to be captured by the camera system 300 camera, as received from the field of view through an opening 240 (e.g., an opening of the teleprompter housing 210), while providing a display that is perceivable to an observer (e.g., human user 110). In an example, the dual camera system 300 is positioned on a rear platform 230 of the teleprompter video display system 200 with use of an elevated camera platform 235. The positioning of the dual camera system 300 relative to the opening 240 allows the dual camera system 300 to capture IR and visible light from the field of view (and the objects such as the human user 110 that are illuminated or silhouetted within the field of view). Other forms of platforms, tripods, mounts, and the like may be used to position and adjust the dual camera system 300 or the teleprompter video display system 200.

FIG. 1B depicts a front view 100B of the video capture environment, showing the perspective of the dual camera system 300 from behind the dual camera system 300 and the teleprompter video display system 200 (e.g., in the same direction that the IR and visible light cameras capture the field of view). Accordingly, the dual camera system 300 is arranged to capture video of the field of view, from light received within the opening 240 through the two-way display screen 250. A more detailed perspective illustration of how the camera output is captured via the dual camera system 300 and output via the two-way display screen 250 is discussed below and depicted with reference to FIG. 6.

FIG. 1C depicts another perspective view 100C of the video capture environment, showing the human user 110 located within the field of view of the teleprompter video display system 200. In this perspective view 100C, the two-way display screen 250 is visible. In an example, the two-way display screen 250 is arranged reflect a video output projected from the display source 220 through a mirror or a series of mirrors (not shown). The two-way display screen 250 is arranged relative to the dual camera system 300 to allow IR light (e.g., emitted from the backdrop 120) and visible light (e.g., emitted from the lights 130) from the field of view, to travel through the two-way display screen 250, and through the opening 240, to reach the dual camera system 300. In an example, the light may reach a hot mirror of the dual camera system 300, used to split IR and visible light. Further illustrations of the hot mirror of the dual camera system 300, and the positioning of the IR and visible light cameras relative to the opening 240, are described below.

FIG. 1C also depicts a rear side of the backdrop 120, outside of the field of view. Here, the rear side of the backdrop 120 is structured to host a series of IR light emitters 124, such as with an array of light bars emitting NIR wavelengths through the backdrop 120, towards the field of view. These IR light emitters 124 may be used to provide a backlit environment of objects in the field of view, as the IR light emitters 124 emit IR light in the direction of the dual camera system 300. In a specific example, the backdrop 120 includes a plastic diffusion unit affixed to each strip of LEDs within the array of IR light emitters 124; additionally, approximately 6 inches from the LEDs, a dual-vision projection surface may be disposed within the backdrop 120 to act as an infrared diffusion layer. As a result, a consistent and uniform glow may be emitted through the backdrop 120 from the various emitters 124.

Based on the configurations depicted in the present disclosure, visible (color) lighting within the environment is positioned to create the widest range of lighting styles and looks for video portraiture. In an example, each light of the lights 130 is arranged equidistant from the performance center point, and the lights beams may be spread to an appropriate width to encompass a range of human heights. Further, the IR lighting may be positioned in an array at an appropriate distance from a diffusion surface (e.g., which has been layered with a matte soft black fabric) of the backdrop 120, to create fully glowing surface of the backdrop in IR, while also absorbing visible light. With such consistent backdrop IR illumination, the video processing system is able to create a very efficient and accurate matte—even allowing for capturing aspects of transparency in a performer's hair or wearables. A more detailed perspective illustration of how the visible and IR light is emitted at the objects within the field of view is discussed below and depicted with reference to FIG. 5B. Additional description of the arrangement of the camera system 300 is provided in U.S. patent application Ser. No. 15/713,057 to Hal Lovemelt et al., filed Sep. 22, 2017, and titled NEAR-INFRARED VIDEO COMPOSITING, which is incorporated by reference in its entirety.

Figure 2A:
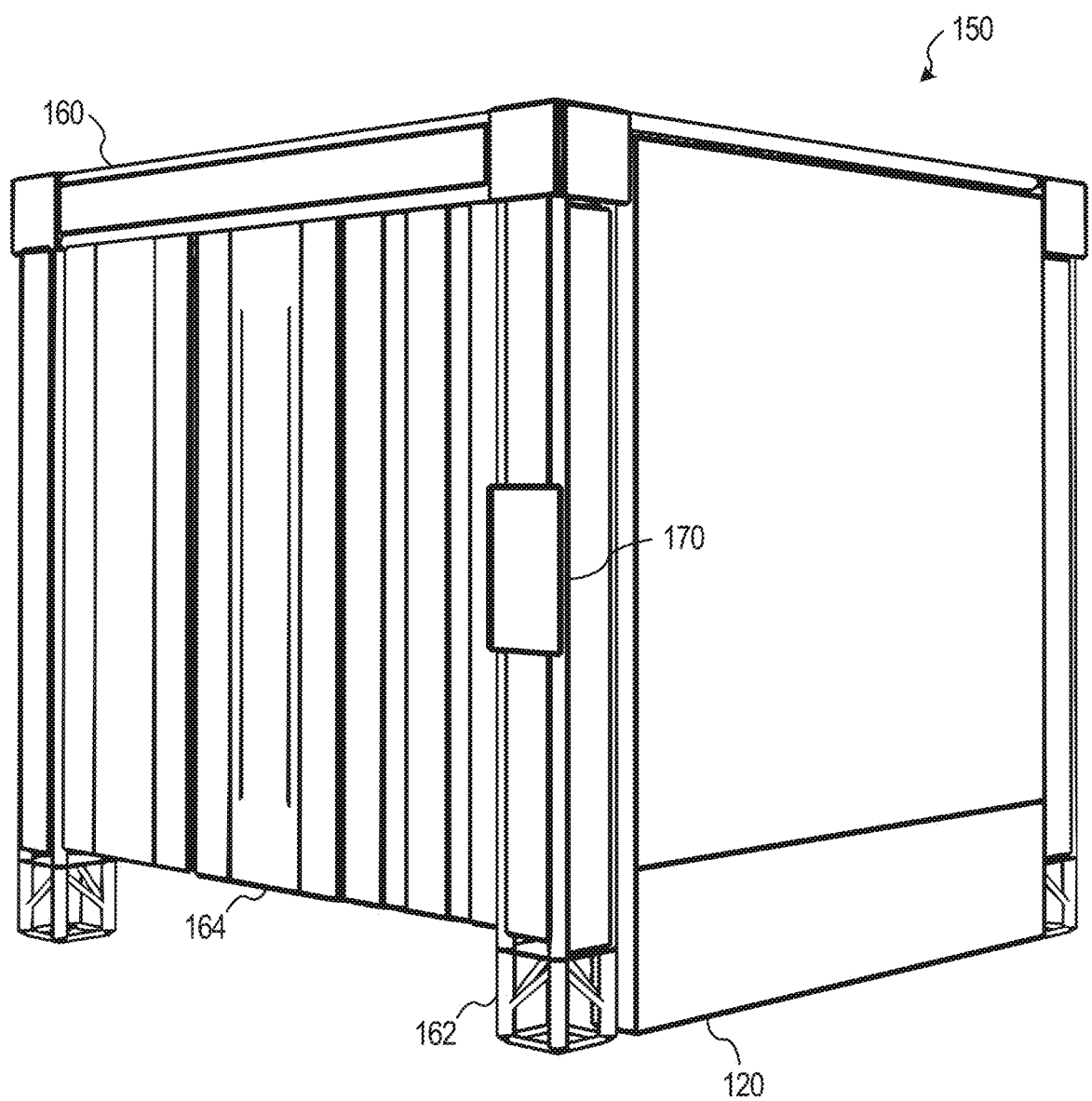
FIGS. 2A-2B illustrate exterior views of an interactive unit for capturing video of a subject, according to an example.
Figure 2B:
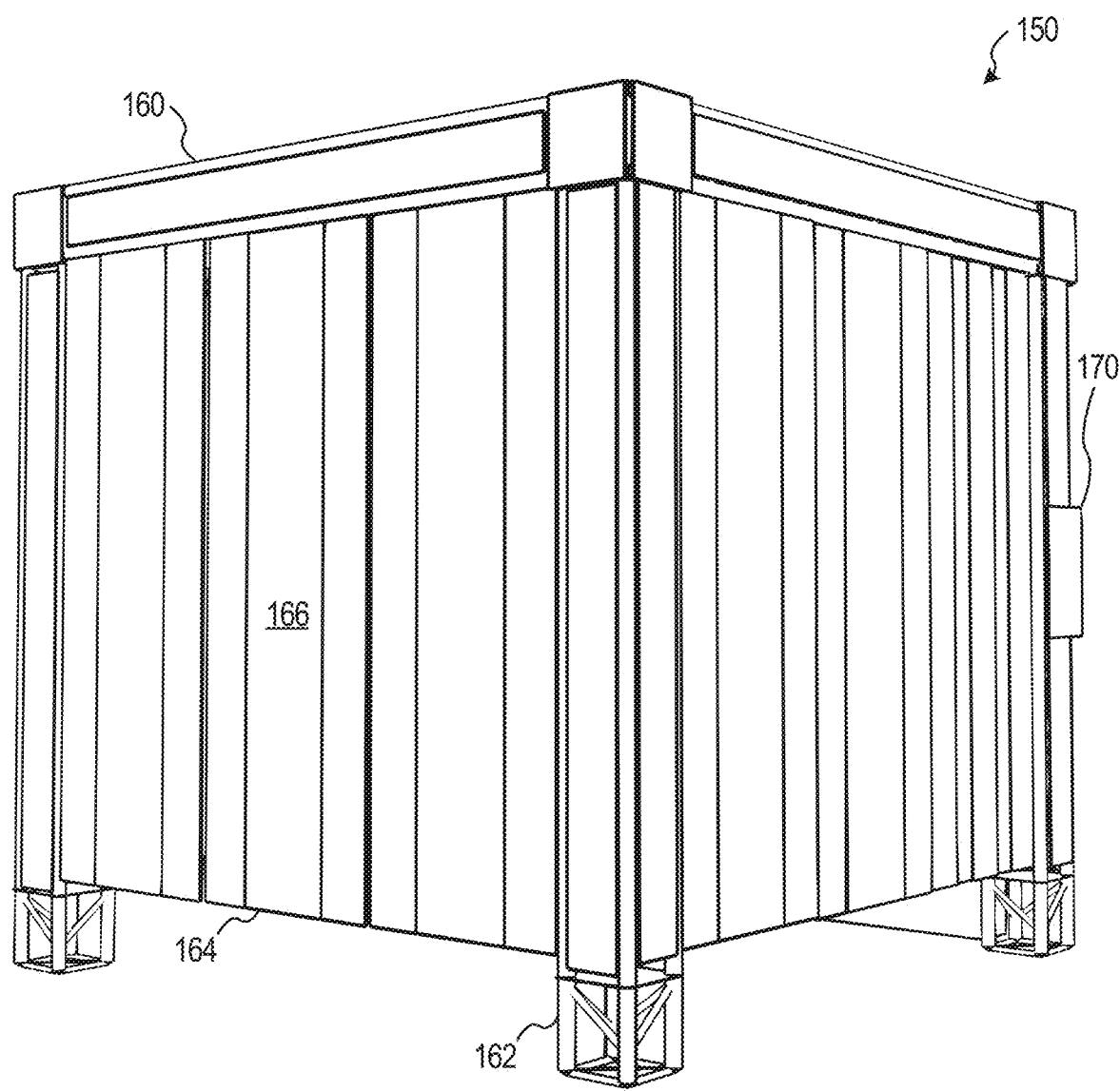

FIGS. 2A-2B illustrate exterior views of an example interactive stage structure 150 adapted for capturing and displaying video of a subject with hosting of the teleprompter video display system 200, dual camera system 300, and the other input, output, and processing components described herein. Specifically, FIG. 2A and FIG. 2B each provide perspective views of an exterior of the interactive stage structure 150, with the structure being sized to host a human user and define a controlled area for the camera field of view.

As shown in FIG. 2A, the interactive stage structure 150 includes a set of walls 164 (which may include curtains or other material to block out light, e.g., not limited to a rigid structure) attached via a frame 160 and posts 162. For simplicity, only one of the walls 164, posts 162, and frame sides is labeled. FIG. 2A illustrates the placement of the frame 160 and posts 162, surrounding the backdrop 120. The backdrop 120 accordingly establishes one of four sides of the interactive stage structure 150, whereas the walls 164 establish the remaining sides. FIG. 2B illustrates a perspective view that is opposite of the view of FIG. 2A, with multiple of the walls 164 visible.

In an example, the walls 164 include one or more openings (e.g., a door or a slot in a curtain) on one or more sides, to allow a human user or other objects to enter the interior chamber defined by the interactive stage structure 150. Also in an example, an exterior surface 166 of the walls 164 allows the attachment or coupling of materials. For instance, the walls 164 may be "wrappable" with various forms of skins or wrappings, to allow advertisements, logos, or other branding or designs to be applied to the structure 150 (including in the form of various exterior "shell" structures). A variety of attachment mechanisms and materials may be used to couple such skins or wrappings to the interior or exterior of the structure 150. Further, although the walls 164 are not shown as extending to a floor, other variations to the structure 150 may provide a completely closed (and user-immersed) environment.

Also as an example, a cover over the structure 150 may be arranged to act as a roof on the structure, to enclose the structure and separate the interior chamber from an outside environment. In another example, the structure shown in FIG. 2A may be further enclosed within a wrap or other structure to curtail ambient light. For example, the structure in FIG. 2A may not include walls, but may be situated within a larger light blocking structure. In still other examples, the shape of the structure may be adapted into a dome, sphere, pod, cage, or other formats. Also as an example, the structure 150 may be sized to host a small number of persons (e.g., 1-4 persons) and small objects and props; in other examples, the structure may be sized to host a larger group of persons (e.g., between 8-12 persons) or larger objects or props.

In an example, various user interactive features may be presented or hosted on the exterior of the interactive stage structure 150 for user engagement or information display purposes. For instance, a display screen 170 may be mounted on an exterior location (e.g., coupled to one of the posts 162), with the display screen providing a real-time, third-person perspective display of aspects of the interior of the environment, which may include a virtual background composited with video. In an example, the display screen 170 may output a real-time display of the video being captured from within the interactive stage structure 150. In another example, the display screen 170 may output instructions or other information related to the capture of video from within the interactive stage structure 150 or use of the dual camera system 300.

In still another example, the display screen 170 and accompanying input devices (e.g., a touch screen within the display screen 170, a voice-interactive interface, and the like) may provide user-interactive features to collect information on the user, such as desired video backgrounds or special effects, preferences, and environment controls or themes. The user-interactive features provided may also integrate with internet or app-based services, such as to allow a user to control special effects via input on the user's smartphone, and to playback or download a video clip produced from the video environment. For instance, a user may interact with the display screen 170 to choose and configure the experience to occur within the video environment; the user may also enter contact information to electronically obtain content from the performance within the video environment.

In still another example, the display screen 170 (or other external devices) may be used by staff or an administrator to control and direct a user's experience within the environment. For instance, a director may monitor a user's performance within the environment, control aspects of video, lighting, audio, and effects, and provide direction and guidance to the user via communications from outside the environment. Other aspects of electronic communication, control, and display devices that are not depicted may be used by a director or other trained staff.

Figure 2C:
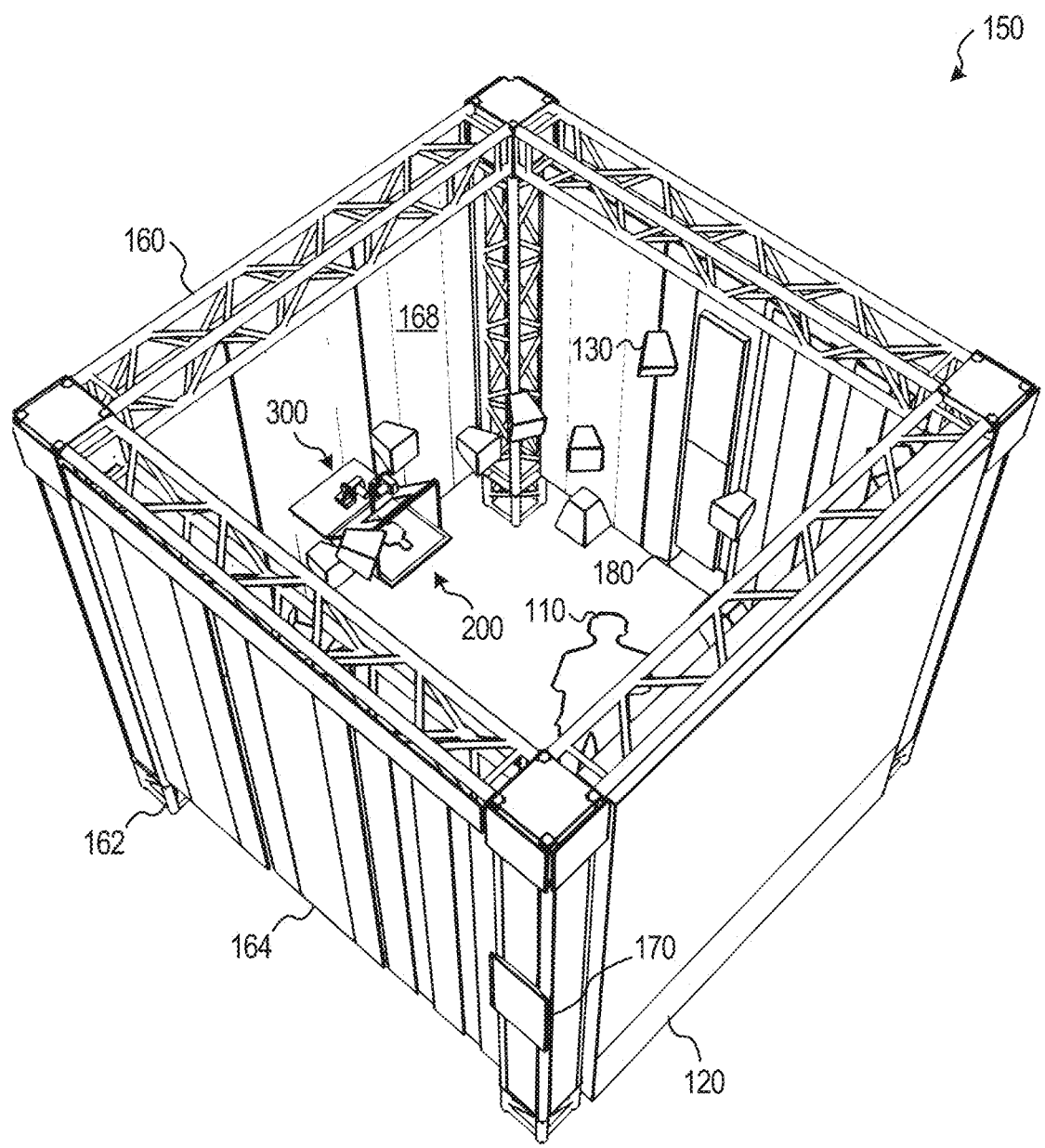
FIG. 2C illustrates a top perspective view of the interactive unit for capturing video of a subject, according to an example.

FIG. 2C illustrates a top perspective view of the interactive stage structure 150, defining an interior space for capturing video of a subject. As shown, the frame 160, posts 162, and walls 164 define an interior chamber in which the human user 110 can move within (and into and out of). As shown, the field of view that exists between the dual camera system 300 (and the teleprompter video display system 200) and the backdrop 120 is illuminated by the various lights 130. FIG. 2C further illustrates placements of the lights 130 in a three-dimensional perspective, with numerous of the lights being positioned on features of the interactive stage structure 150, such as on the frame 160, the posts 162, or the walls 164.

In FIG. 2C, an interior surface 168 of the walls 164 is depicted. In an example, the interior surface 168 may include a matte (non-smooth) fabric material designed to absorb light (infrared or visible) such that light is not reflected off the interior surface 168, because light reflected of such surfaces may interfere with operation of the dual camera system 300 or exposures of a produced video. In an example, the interior chamber may include one or more user-interactive components, which may or may not be visible from within the camera field of view. These components may provide the output of video and information from within an interior video display 180, such as a display screen mounted on one of the walls 164.

Figure 2D:
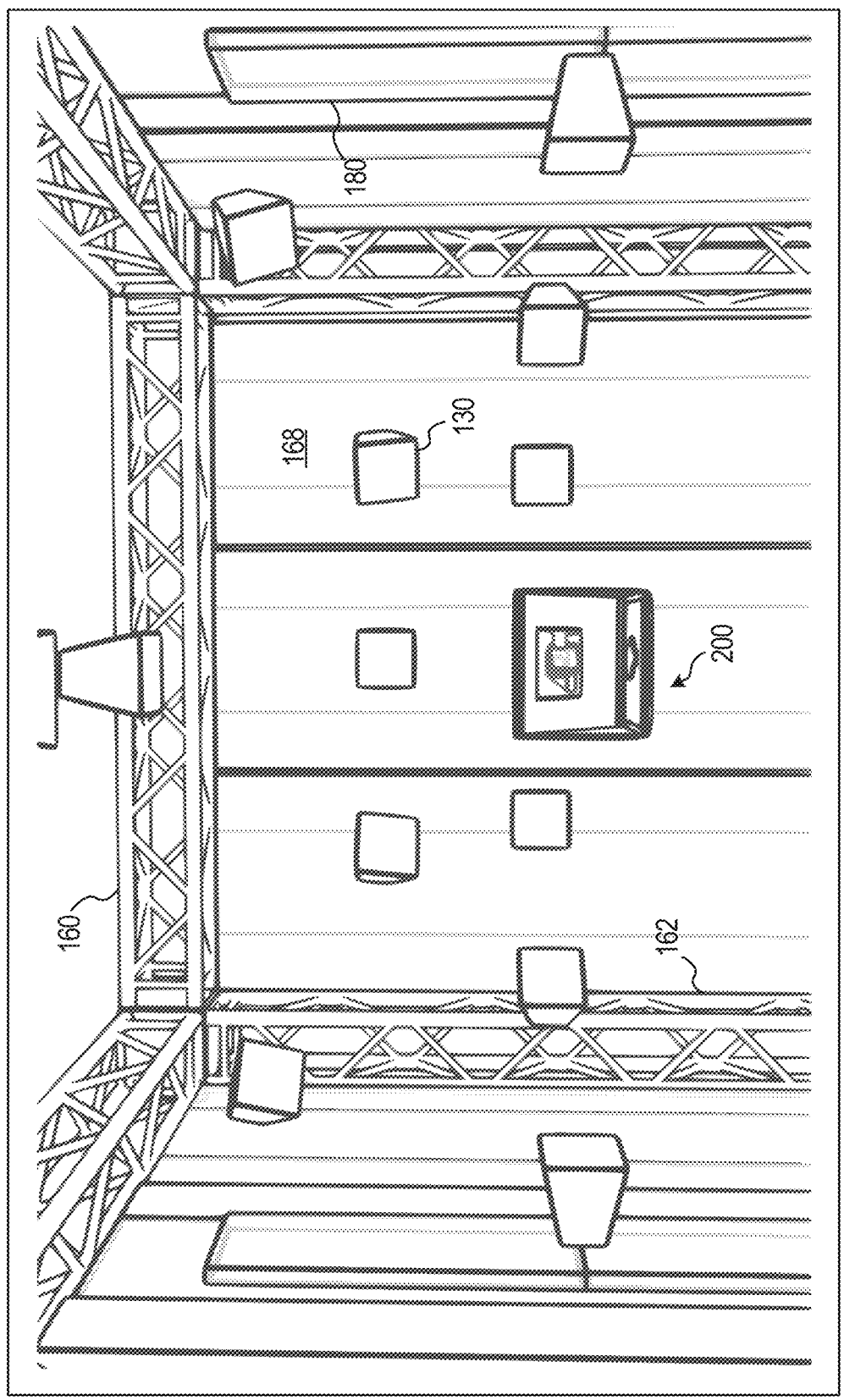
FIGS. 2D-2E illustrate interior views of the interactive unit for capturing video of a subject, according to an example.
Figure 2E:
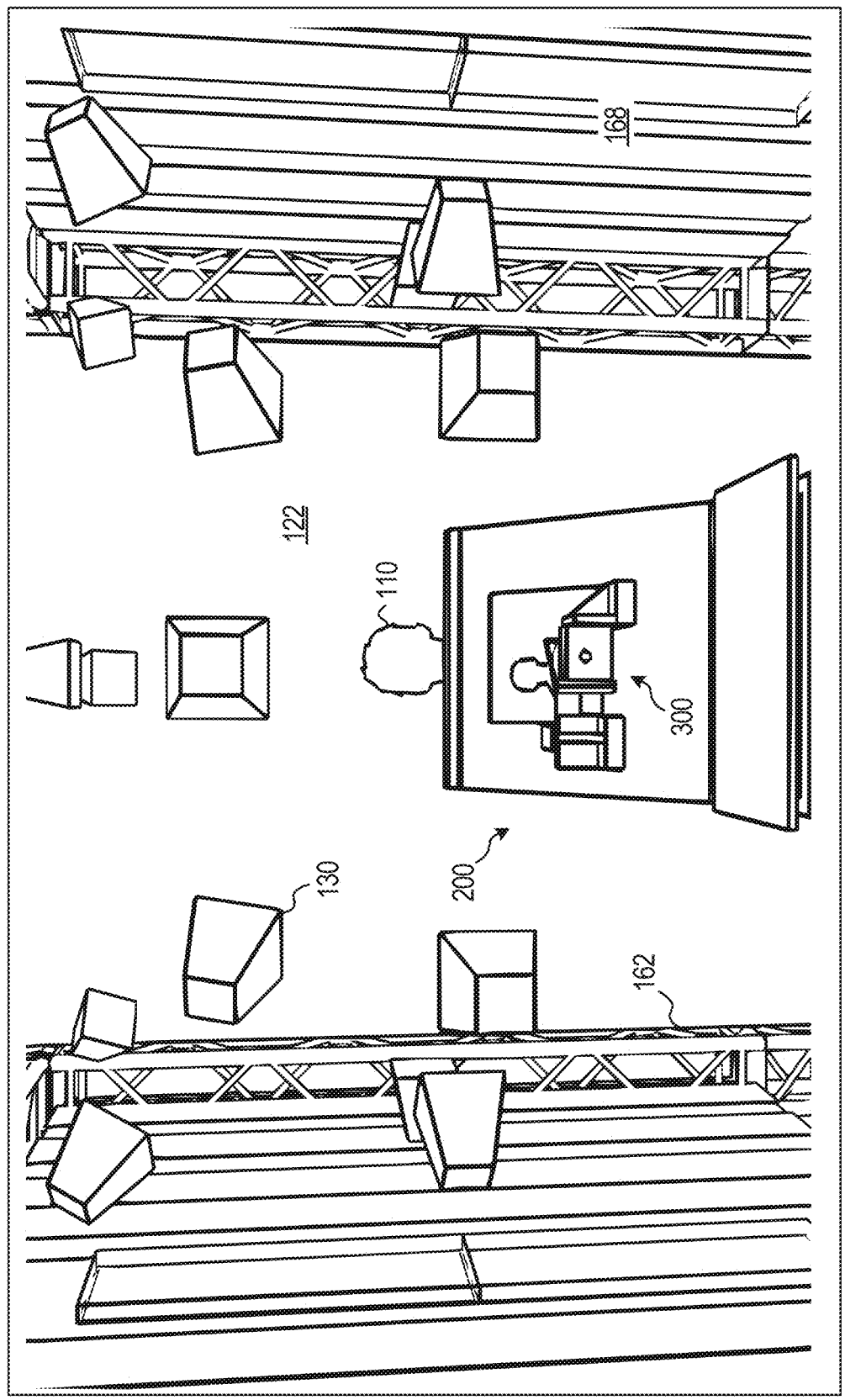

FIGS. 2D-2E illustrate interior views of the interactive stage structure 150 for example scenarios of capturing video of a subject. FIG. 2D provides a view from an orientation of a human user (e.g., human user 110) within the field of view of the camera system 300 and the teleprompter video display system 200. As depicted, the lights 130 are focused to surround and aim visible light on the human user. As the human user faces forward, the human user will perceive the output of the video display from the teleprompter video display system 200. FIG. 2E provides a view from an opposite orientation, towards the human user (e.g., human user 110), from the orientation of the camera system 300 and the teleprompter video display system 200.

Although numerous aspects of the frame 160, the posts 162, or the walls 164 are depicted as being visible in FIGS. 2A-2E, in some examples, these structures may be wrapped, disguised, or hidden behind other structures or facades. Additional doors or openings not shown may be integrated into the walls 164. Further, additional electronic or interactive components and special effects devices (e.g., fog/smoke machines, speakers, lasers) may be supported by the frame 160, the posts 162, the walls 164, or other aspects of the structure 150.

Figure 3A:
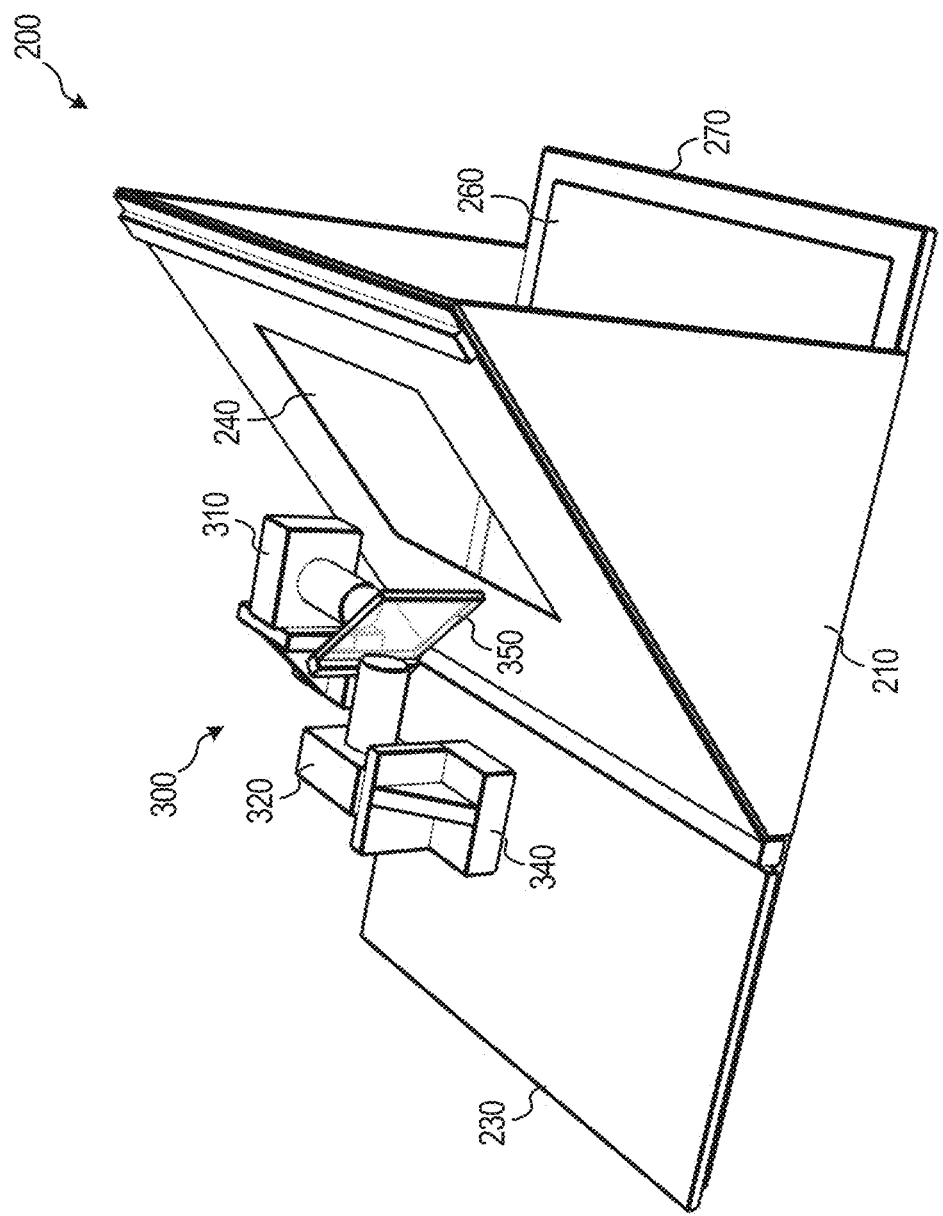
FIGS. 3A-3C illustrate front and perspective views of the near-infrared video compositing camera system used with in a video teleprompter system, according to an example.
Figure 3B:
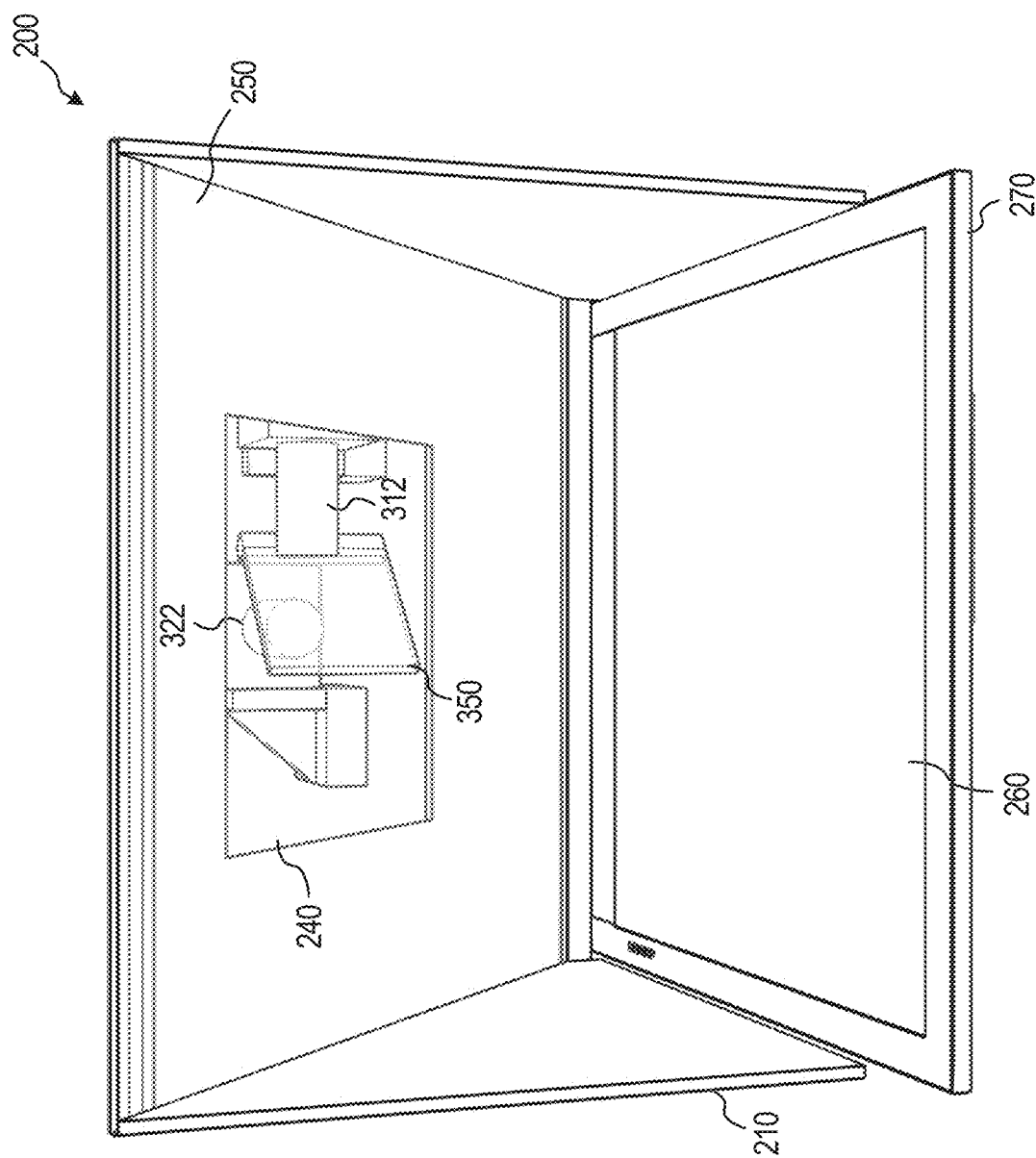
Figure 3C:
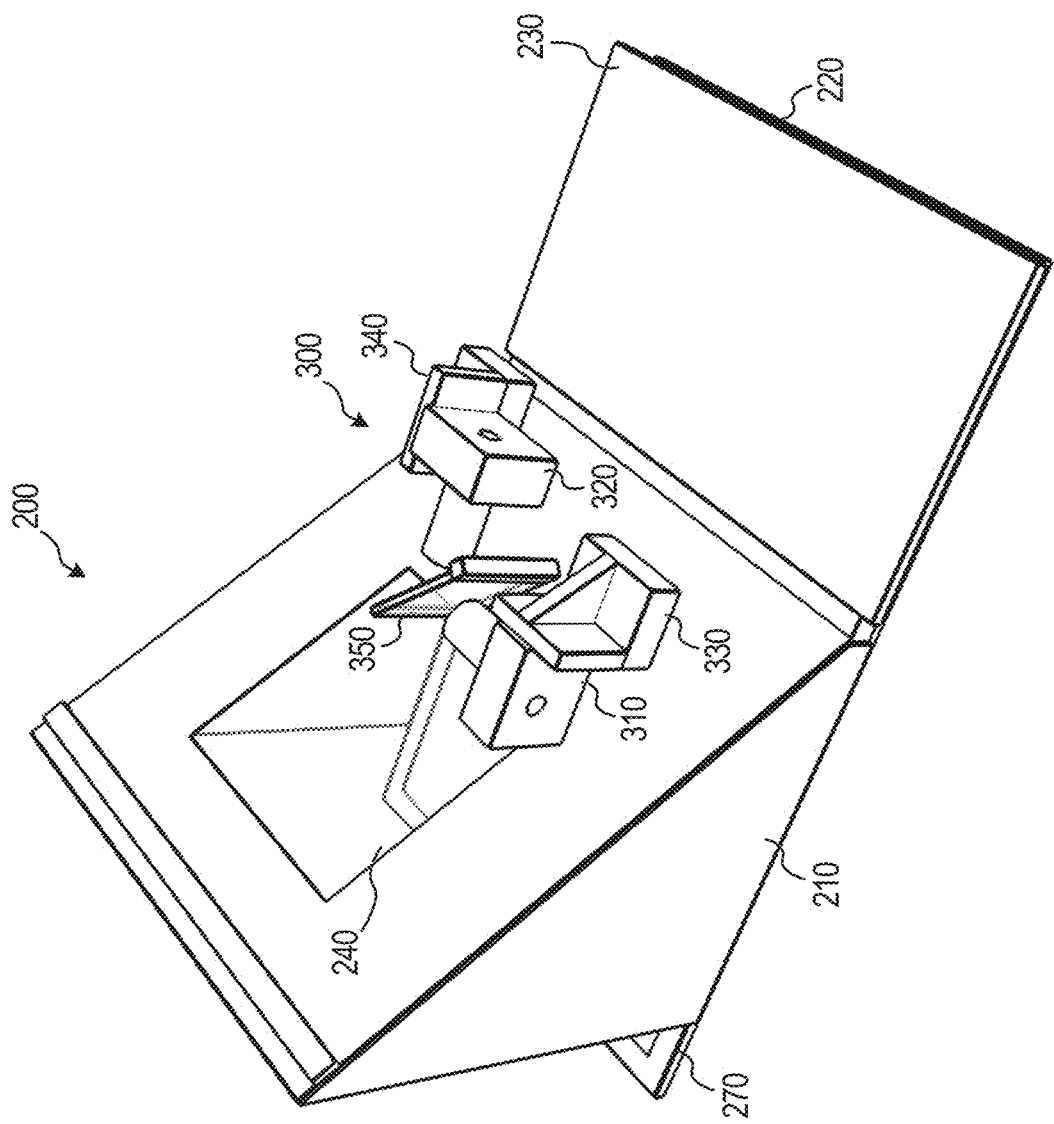

FIGS. 3A-3C illustrate front and perspective views of the dual camera system 300 within use of the teleprompter video display system 200. Specifically, as shown in FIG. 3A, the dual camera system 300 is positioned on the rear platform 230, with the second camera unit 320 (a visible light camera) facing directly forward towards the opening 240. The hot mirror 350, as discussed above, filters out IR light wavelengths, allowing the second camera unit 320 to capture video from visible lights. At the same time, the hot mirror 350 reflects the IR light wavelengths towards the first camera unit 310 (an infrared light camera) that faces a direction perpendicular to the opening 240.

FIG. 3B further illustrates a front view of the teleprompter video display system 200, with portions of the dual camera system 300 being illustrated in FIG. 3B as visible through the two-way display screen 250 through opening 240. The housing 210 of the teleprompter video display system 200 may also define sides (e.g., a shroud) used to block light coming from other directions from reaching the two-way display screen 250, and a display reflector 260 hosted within a frame 270. In an example, the display reflector 260 outputs a reverse projection from the display source (not shown) that is then reflected off the two-way display screen 250; in another example not depicted, the display source is hosted by the frame 270 to directly output the reverse projection towards the two-way display screen 250.

FIG. 3C further illustrates a rear perspective view of the teleprompter video display system 200 and the dual camera system 300 attached thereon. The teleprompter video display system 200 may also include a variety of other structural and functional components not depicted for simplicity.

In an example, the teleprompter video display system 200 may include a monitor to project light onto the two-way display screen 250, for example reflected from the monitor by a mirror or a series of mirrors to reach the two-way display screen 250. The monitor may be located, for example, below the dual camera system 300. In another example, a mirror may be used to reflect light from a projector onto the two-way display screen 250. The projector may be located remotely from the teleprompter video display system 200.

Figure 4A:
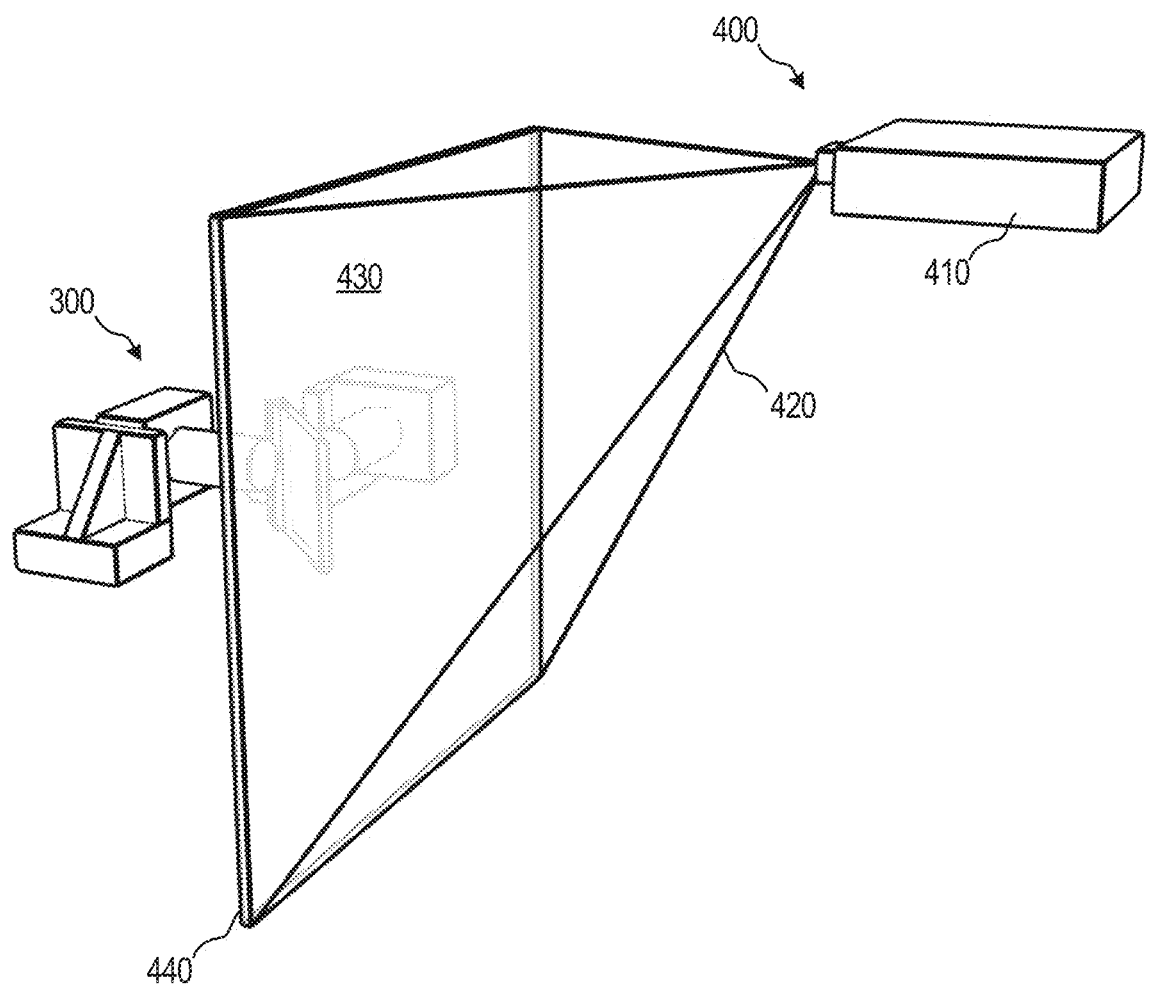
FIGS. 4A-4C illustrate top and perspective views of the near-infrared video compositing camera system used with in a video projection system, according to an example.
Figure 4B:
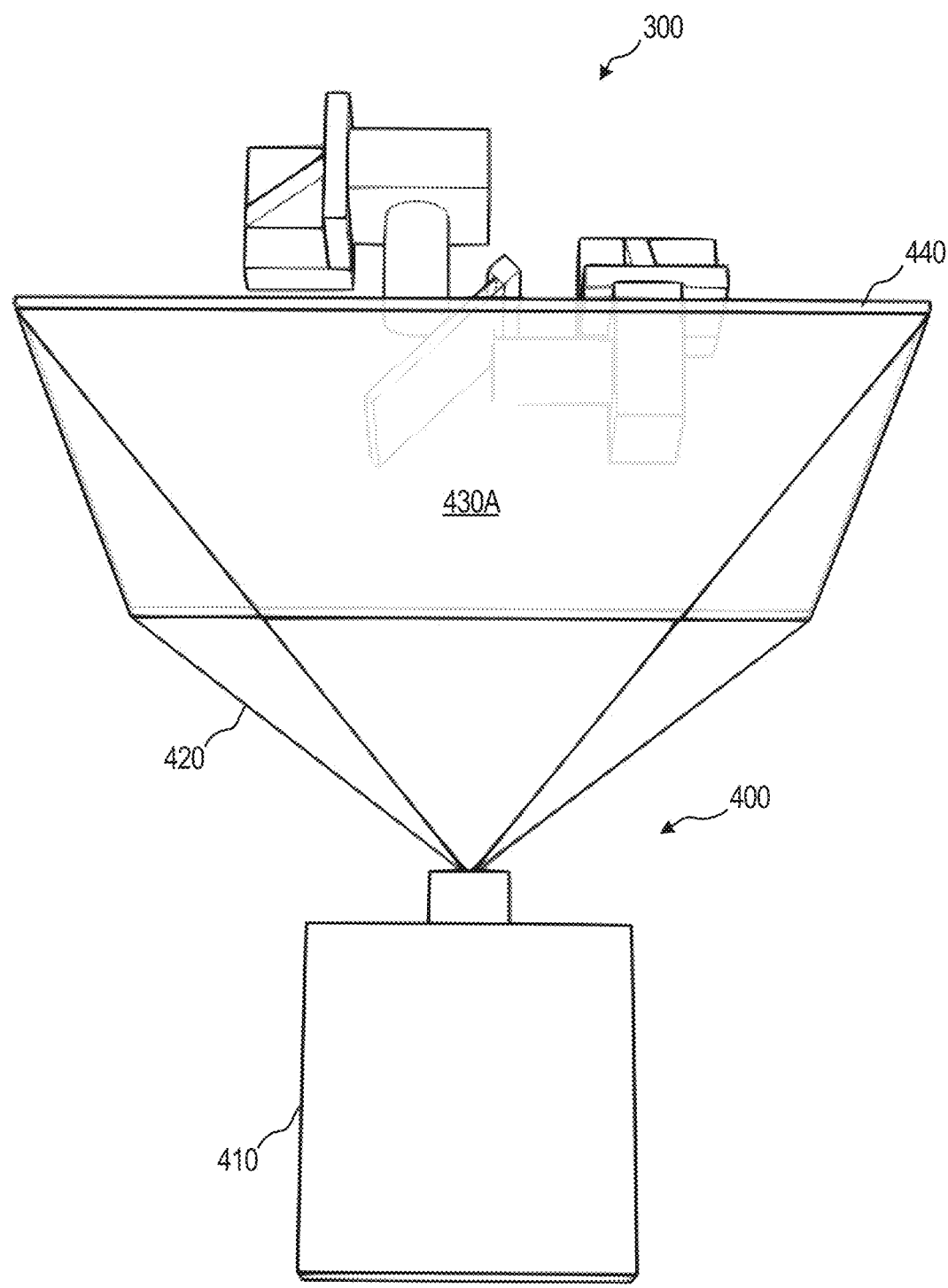
Figure 4C:
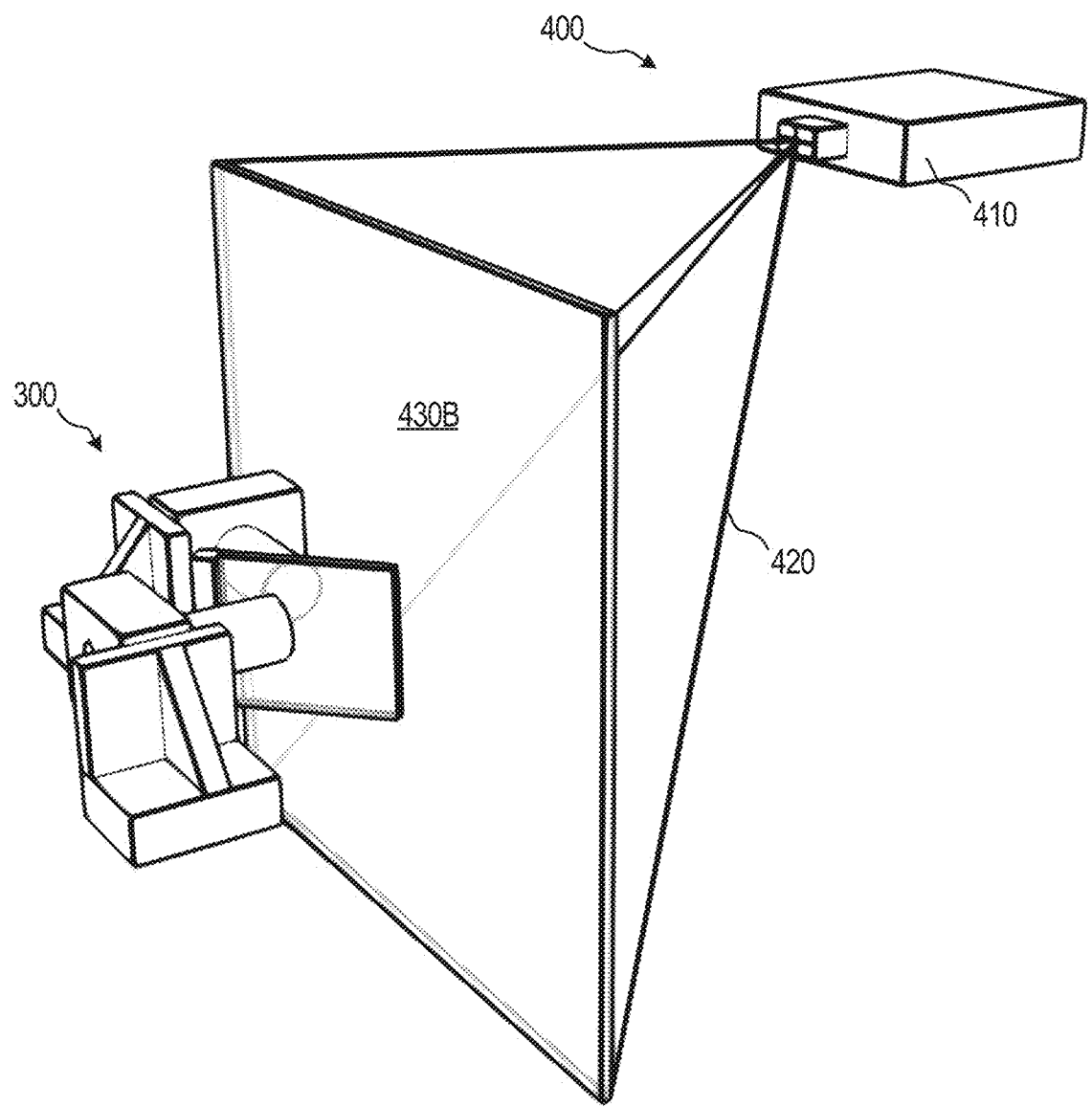

FIGS. 4A-4C illustrate top and perspective views of the dual camera system 300 with use in a video projection system 400. In an example, the video projection system 400 is provided as a replacement of the teleprompter video display system 200. The video projection system 400 provides for use of a projection screen 440 in place of various teleprompter arrangements and the two-way display screen 250. However, it will be apparent that many of the components and approaches utilized in the teleprompter video display system 200 and the associated placement of the dual camera system 300 may also be applicable to the environment of the video projection system 400.

FIG. 4A illustrates a side perspective view of the video projection system 400, which provides video output 420 from a projector unit 410 towards a projector screen surface 430. In an example, the projector screen surface 430 is provided from a projection screen 440 made of specialized two-way glass (a reciprocal mirror). In an example, the projection screen is made of a microlens array (MLA) material that allows projected light (e.g., video output 420) to be reflected, while allowing other light (e.g., visible and infrared light from the field of view) to pass through to the camera. Other materials and forms of two-way projection screens may also be utilized.

FIG. 4B illustrates a top perspective view of the video projection system 400, specifically showing the projection of the video output 420 onto a first side 430A of the projection screen 440. FIG. 4C similarly illustrates a rear perspective view of the video projection system 400, specifically showing the arrangement of the dual camera system 300 relative to a second side 430B of the projection screen 440.

Figure 5A:
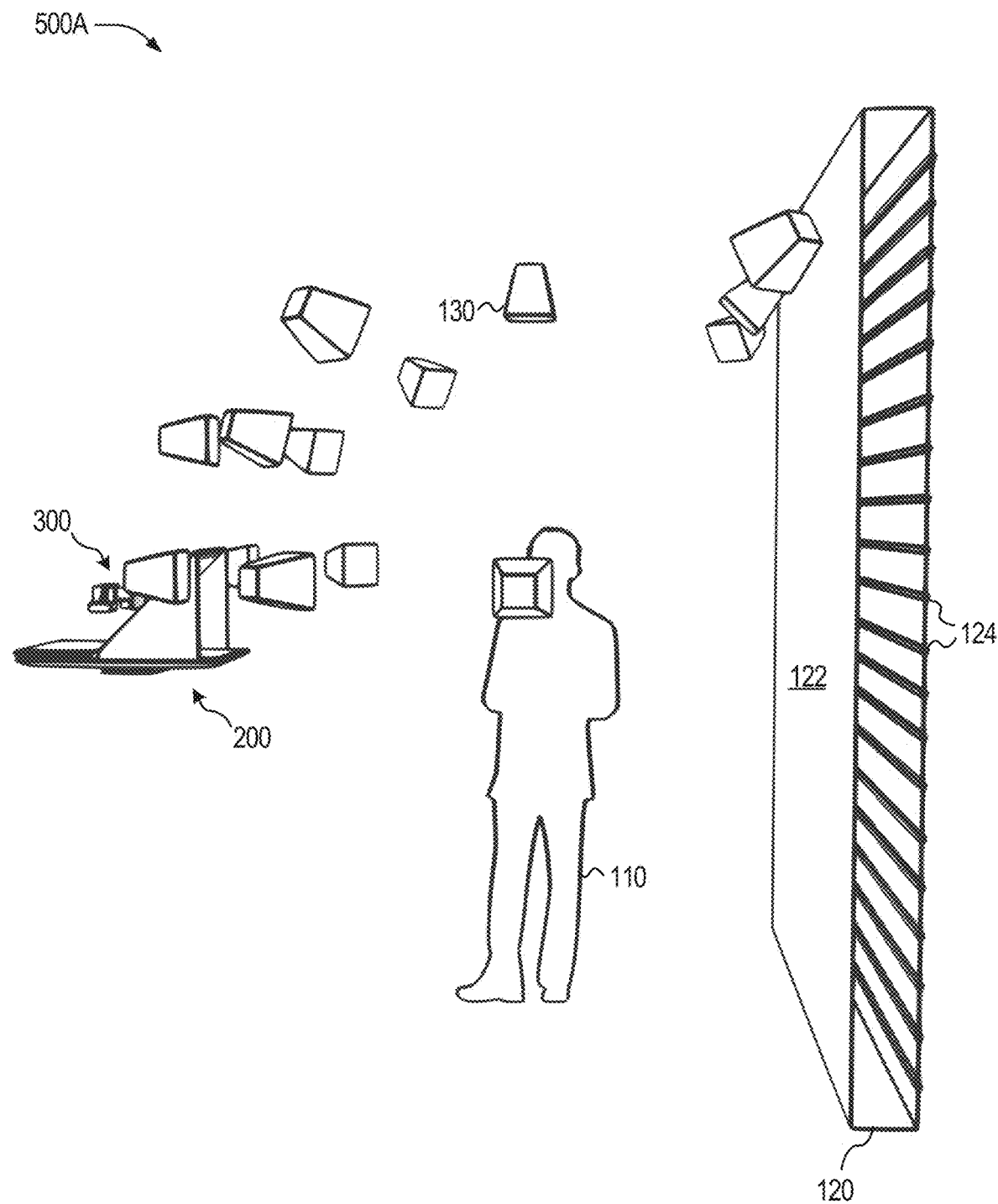
FIGS. 5A-5B illustrate side views of infrared and visible light sources for use with the near-infrared video compositing camera system, according to an example.
Figure 5B:
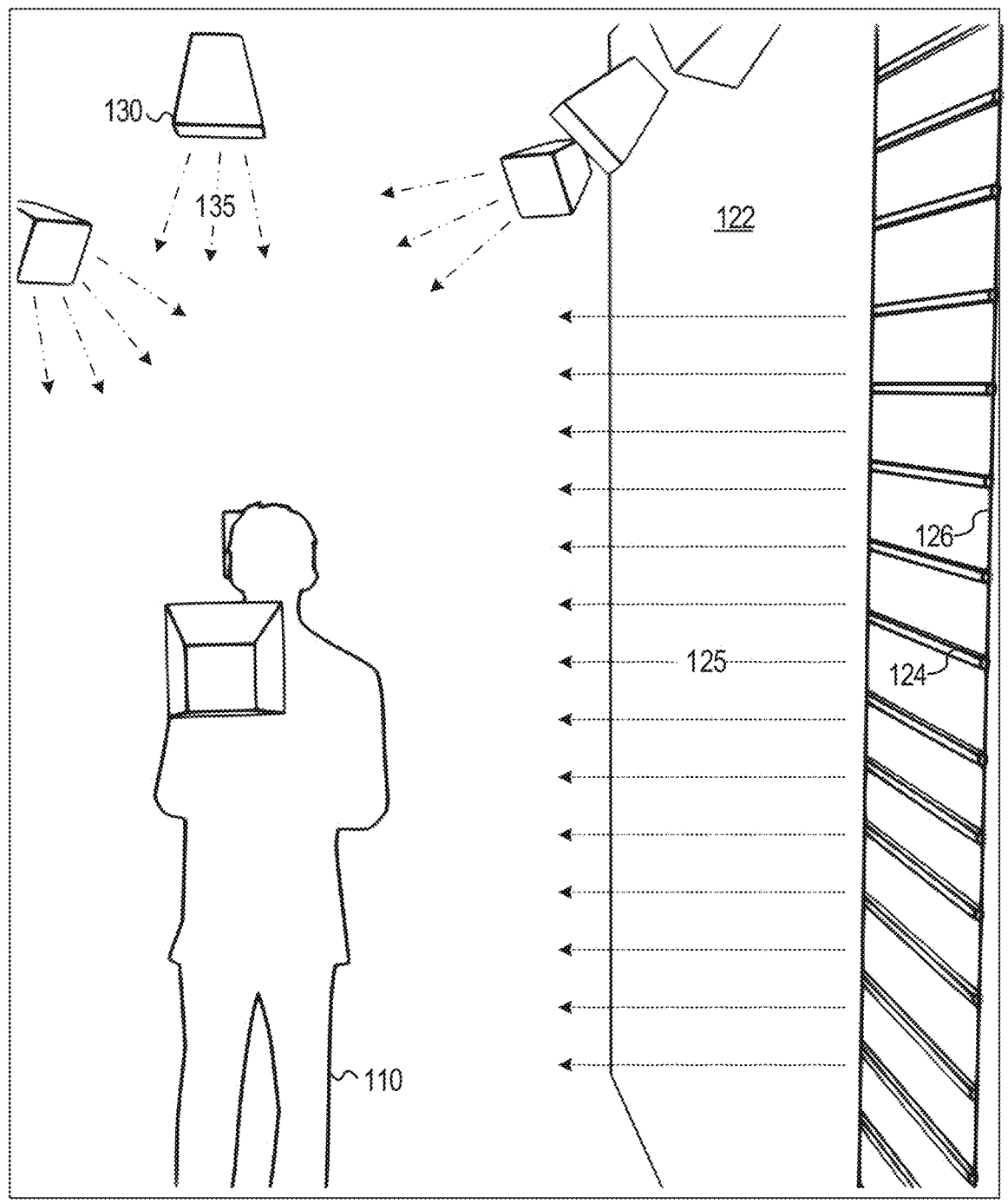

FIGS. 5A-5B illustrate side views of infrared and visible light sources for use with the near-infrared video compositing camera system, according to an example. In FIG. 5A, the human user 110 is positioned in an environment 500A relative to visible light emitters (e.g., lights 130) within a subject area between the teleprompter video display system 200 and the backdrop 120. The field of view that can be captured by the dual camera system 300 (hosted on the teleprompter video display system 200) includes part of the subject area, and is dependent based on the focal distance, lens, and positioning of the dual camera system 300 relative to any objects in the field of view (e.g., the human user 110).

FIG. 5B illustrates a path traveled by infrared light 125 from infrared light emitters (e.g., an array of IR light emitters 124, suspended in a grid 126) and by visible light 135 from visible light emitters (e.g., lights 130). In an example, the infrared light 125 travels from behind a human user 110 toward the dual camera system 300 (visible in FIG. 5A, not visible in FIG. 5B). As the infrared light 125 travels to the dual camera system 300, part of the infrared light 125 is blocked by the human user 110 from reaching the dual camera system 300. Using the infrared light that reaches the dual camera system 300, collected by an infrared detection camera, a shape of the human user 110 can be determined. In an example, light that reaches the infrared detection camera represents a background area, which may be subtracted out of a visible light image taken by visible light detection camera of the dual camera system 300 arranged to view the same field of view as the infrared detection camera. The visible light 135 reflects off of and illuminates the human user 110. The reflected light reaches the visible light detection camera, which captures an image including the human user 110.

FIG. 6 illustrates an example detailed view of video capture and output from the near-infrared video compositing camera system with use of the teleprompter video display system 200. As shown, the human user 110, who is facing the teleprompter video display system 200 and the display screen 250, is able to view an output of a real-time video feed being captured by the dual camera system. The display reflector 260 is arranged to project visible light originating from the display source towards the display screen 250; the visible light is reflected by the display screen to provide a video output from the display source that is visible from the perspective of the user.

In a properly calibrated setting, where the user is not located immediately next to the teleprompter video display system 200 (e.g., the user is a suitable distance from the system 200), the reflection from the display screen 250 may provide a real-time output of a computer-modified video including the user. In this fashion, the display screen 250 may serve as type of a video monitor for live preview and playback of video applications. In performance environments, the structure of the teleprompter video display system 200 (or, of the dual camera system 300) may be disguised or hidden from the performance area, to provide a further illusion of a monitor rather than a camera source.

Figure 7:
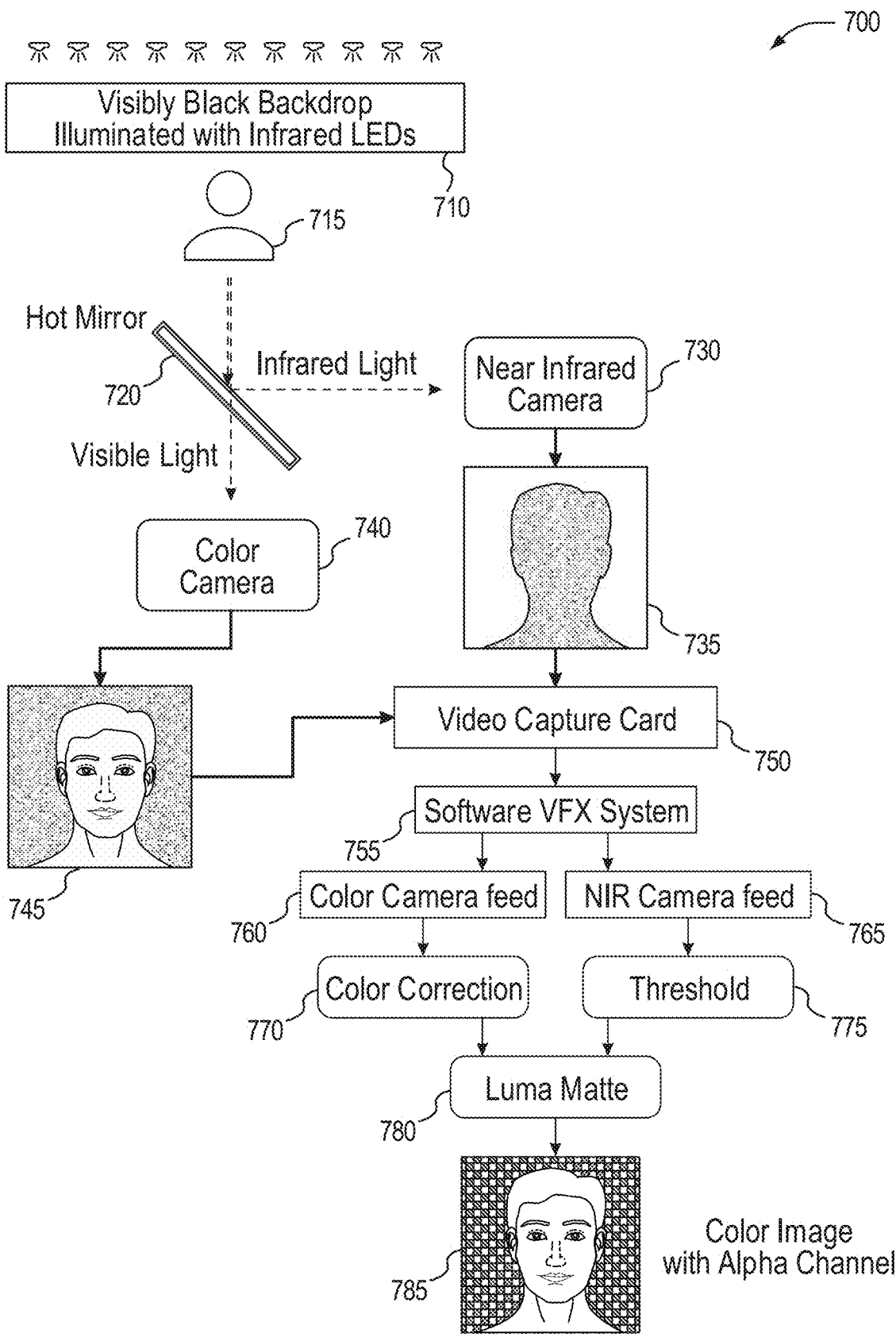
FIG. 7 illustrates an overview of a visible and near-infrared video processing sequence for video compositing, according to an example.

FIG. 7 illustrates an overview of a visible and near-infrared video processing sequence 700 for video compositing, according to an example. The sequence 700 can start with infrared light permeating a visibly black (or dark, e.g., gray) backdrop 710. The infrared light can be emitted by a plurality of infrared LEDs. A first portion of the infrared light is blocked by a human user 715 and a second portion of the infrared light reaches a hot mirror 720. The hot mirror 720 is aligned to reflect infrared light to a near infrared camera 730, and permits visible light (e.g., reflected off the human user 715 from a lighting element) to pass through the hot mirror 720 to reach a color camera 740 (e.g., a RGB camera). The color camera creates an image 745 of the human user with a visible light background present. The near infrared camera 730 creates an infrared image 735, which includes an illuminated background portion and a darkened portion (e.g., silhouette) of the human user 715, corresponding to the second portion and the first portion of infrared light, respectively.

The images 735 and 745 are sent to a video capture card 750, which can store the images (frames) of the video capture. A software virtual effects (VFX) system 755 can be used to further process the images. For example, a color camera feed 760 (e.g., including image 745) can be combined with a NIR camera feed 765 (e.g., including image 735) to create a luma matte 780. Further processing, such as color correction 770 on the color camera feed 760 or thresholding 775 on the NIR camera feed 765 may be performed by the software VFX system 755.

In an example, information from the thresholding 775 may be used to identify a first portion of the image 735 that is foreground and a second portion of the image 735 that is background. Because the color camera 740 and the near infrared camera 730 are focused on the same (or substantially the same) field of view, overlaying the foreground and background portions on the image 745, allows for background subtraction of the image 745 using the luma matte 780 to create a color image with alpha channel 785. For example, a portion of the image 745 corresponding to locations of the second portion of the image 735 that is the background can be removed from the image 745 to create the image 785, while leaving a portion of the image 745 corresponding to locations of the first portion of the image 735 that is the foreground. After the background is removed from image 785, a virtual background (or other background image or video frame) can be added using the software VFX system 755.

Figure 8:
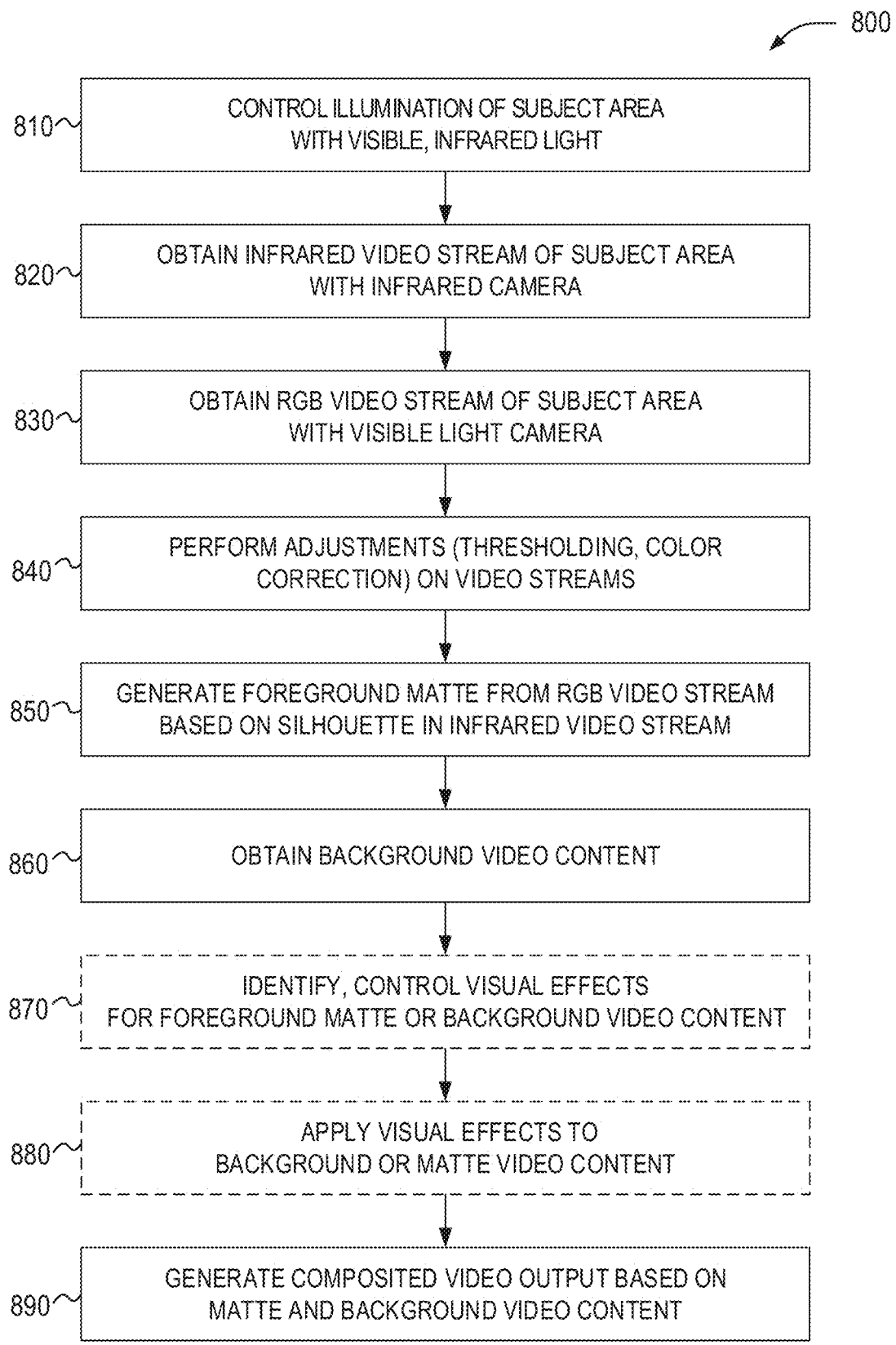
FIG. 8 is a flowchart of an example technique for generating a matte and performing video compositing with the matte via an electronic processing system, according to various examples.

FIG. 8 illustrates a flowchart 800 of an example technique for generating a near-infrared matte and performing video compositing with the matte via an electronic video processing system. The technique of the flowchart 800 may be performed by any of the components, logic, or systems described herein. Further, the order and type of the operations depicted in the flowchart 800 may be added, modified, or substituted using any of the operations or functions described herein. Thus, although the flowchart 800 and the following operations are depicted from the perspective of a video processing system, other types of operations, systems, and devices may be used to perform these or similar operations.

In an example, the method of the flowchart 800 begins with the control of illumination of subject area with visible and infrared light (operation 810). In some examples, this illumination is pre-calibrated to particular characteristics of the subject area and surrounding structure. In other examples, this illumination is varied and changes depending on characteristics of the objects or humans within the subject area or camera field of view. Various forms of automatic and manual adjustments of lighting (e.g., to match a particular scenario) may also be incorporated.

The method of the flowchart 800 continues with the obtaining (e.g., capturing, downloading, accessing) of an infrared video stream of a subject area, originating from an infrared camera (operation 820), and the obtaining (e.g., capturing, downloading, accessing) of an RGB video stream of the subject area, originating from a visible light camera (operation 830). Based on these video streams, further processing, generation of a matte, and compositing may be performed.

In an example, the video streams are captured in software of a computing system (a video processing system) using one or more video capture cards. The digital capture of the video within a video processing system enables the ability to digitally composite and process the video sources with backgrounds, foregrounds, fluid dynamics simulations, computer vision data sources, face tracking algorithms, and other aspects of adjustments and processing. As one specific example of further processing, various adjustments such as thresholding and color correction (operation 840) may be implemented on the RGB or infrared video streams.

The method of the flowchart 800 continues with a generation of a foreground matte from a RGB video stream (operation 850), based on a silhouette of any objects (human and non-human) captured in the infrared video stream. The techniques discussed above with reference to FIG. 7 may be used to establish the foreground matte, to produce a series of color images or frames (defining the foreground matte) having respective alpha channels (defining the transparency). A new background, to replace the alpha channel, may be obtained (e.g., captured, downloaded, accessed) (operation 860).

The method of the flowchart 800 continues with the identification and control of visual effects for the foreground matte or the background video content (operation 870), and the application of such visual effects (operation 880). These visual effects may be user-selected, automatically selected, implemented based on a predefined script or scenario, or the like. These visual effects may include graphical changes to the video (e.g., the addition or changes of colors, addition of computer-generated graphics) or the playback parameters of the video (e.g., to apply slow-motion or fast-motion playback effects). Finally, the composited video output may be provided (e.g., produced, generated, exported, etc.) (operation 890). In further examples, additional visual effects may be applied after the foreground matte and background is composited or otherwise combined into a video stream. Accordingly, real-time video manipulation and effects may be incorporated into an output of the composited video.

As discussed in the various examples herein, the composited video output may be provided to a real-time display after the application of the visual effects (e.g., for output via systems 200 or 400). In still further examples, the video processing system may dynamically record a performance of a user or set of users captured within the environment, and allow digital downloads or delivery of recorded video via an electronic medium or network.

Figure 9:
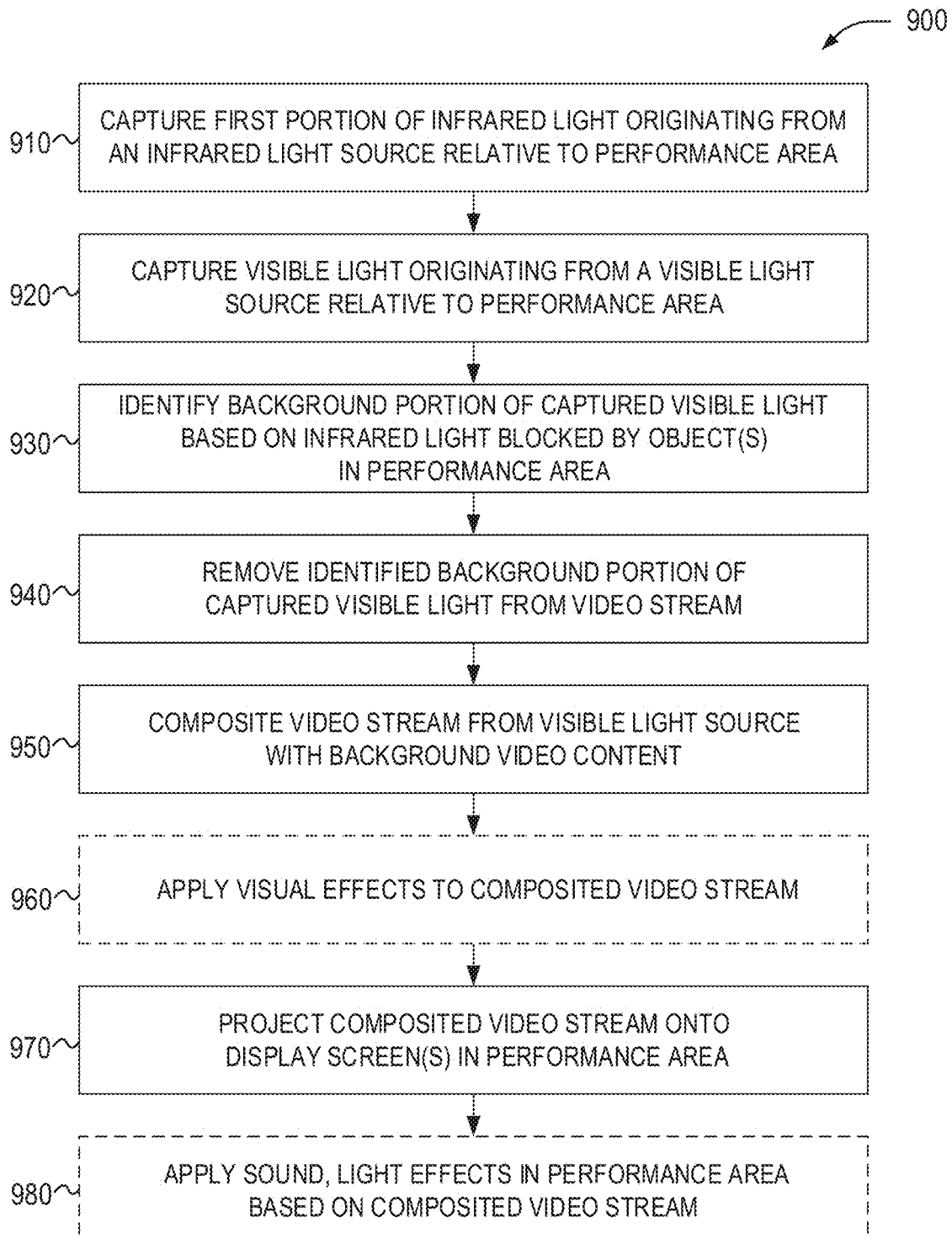
FIG. 9 is a flowchart of an example method for video compositing based on infrared video, according to various examples.

FIG. 9 illustrates a flowchart 900 of an example method for video compositing in an immersive video environment based on infrared video. In a similar manner as flowchart 800, the order and type of the operations depicted in the flowchart 900 may be added, modified, or substituted using any of the operations or functions described herein.

The method of the flowchart 900 begins with the capturing, at an infrared detection camera of a matte camera system, of a first portion of infrared light originating from an infrared light source (operation 910), relative to the performance area. In an example, this infrared light is captured through a display screen arranged between the matte camera system and the infrared light source; in a further example, the infrared light is projected from behind the performance area, which causes a second portion of the infrared light to be blocked by any objects (including humans) in the performance area. In an example, the performance area is hosted within a structure arranged to host the display source, the camera system, and the visible light source; in a further example, the structure is arranged such that visible light from outside the structure is prevented from reaching the visible light detection camera of the camera system.

The method of the flowchart 900 continues with the capturing, at a visible light detection camera of the matte camera system, of visible light originating from a visible light source and traveling through the display screen (operation 920). As discussed in the configurations herein, the visible light originating from the visible light source may be received at the display screen at an angle to a face of the display screen. In an example, the visible light detection camera produces RGB video of a human subject in the performance area, for a human subject who is located between the infrared light source and the display screen within the performance area. In a further example, the visible light source is arranged such that the visible light originating from the visible light source reflects off the human subject to be detected by the visible light detection camera.

The method of the flowchart 900 continues, with the determination of a background portion of video for the captured visible light, based on the infrared light that is blocked by object(s) in the performance area (operation 930). In an example, a second portion of the infrared light (that originates from the infrared light source) from behind is used to establish a silhouette, which identifies a background portion and a foreground portion of the real-time video display. This is followed by the processing operations in the flowchart 900, of the removal of the identified background portion from the captured visible light video stream (operation 940).

The method of the flowchart 900 continues, with the compositing of the video stream produced from the visible light stream (having a background removed) with other background video content (operation 950). As suggested herein, the background video content may be a virtual background (e.g., a computer-generated graphic, a photo, a video frame or set of video frames, or the like). In an optional example, various visual effects may be applied to the composited video stream (operation 960), including to either or both of foreground or background of the composited video.

The method of the flowchart 900 concludes with the output of the composited video stream, such as with a projection onto one or more display screens in the performance area (operation 970). In an optional example, this may be accompanied by various sound, light, and other special effects in the performance area based on the composited video stream (operation 980). In an example, the monitor and the matte camera system may be housed by a teleprompter housing, such that the teleprompter housing is positioned to allow viewing by a human located within a defined environment (e.g., within an enclosed structure). In another example, the display source is a visible light projector, and the visible light projector is adapted to directly or indirectly project the real-time video onto the display screen, such as in a scenario where the visible light projector is arranged between the infrared light source and the display screen to allow viewing by a human within the defined environment (e.g., within an enclosed structure). In a further example, the projection screen is a microlens array (MLA) display screen.

In an example, the output of the video includes projecting light from a display source onto the display screen, such that the projection of the light onto the display screen is visible to a human subject in a performance area. Other variations of displays and display arrangements that allow capture and presentation of video from a common location, in real-time, may also be utilized in addition or in substitute to these arrangements.

Figure 10:
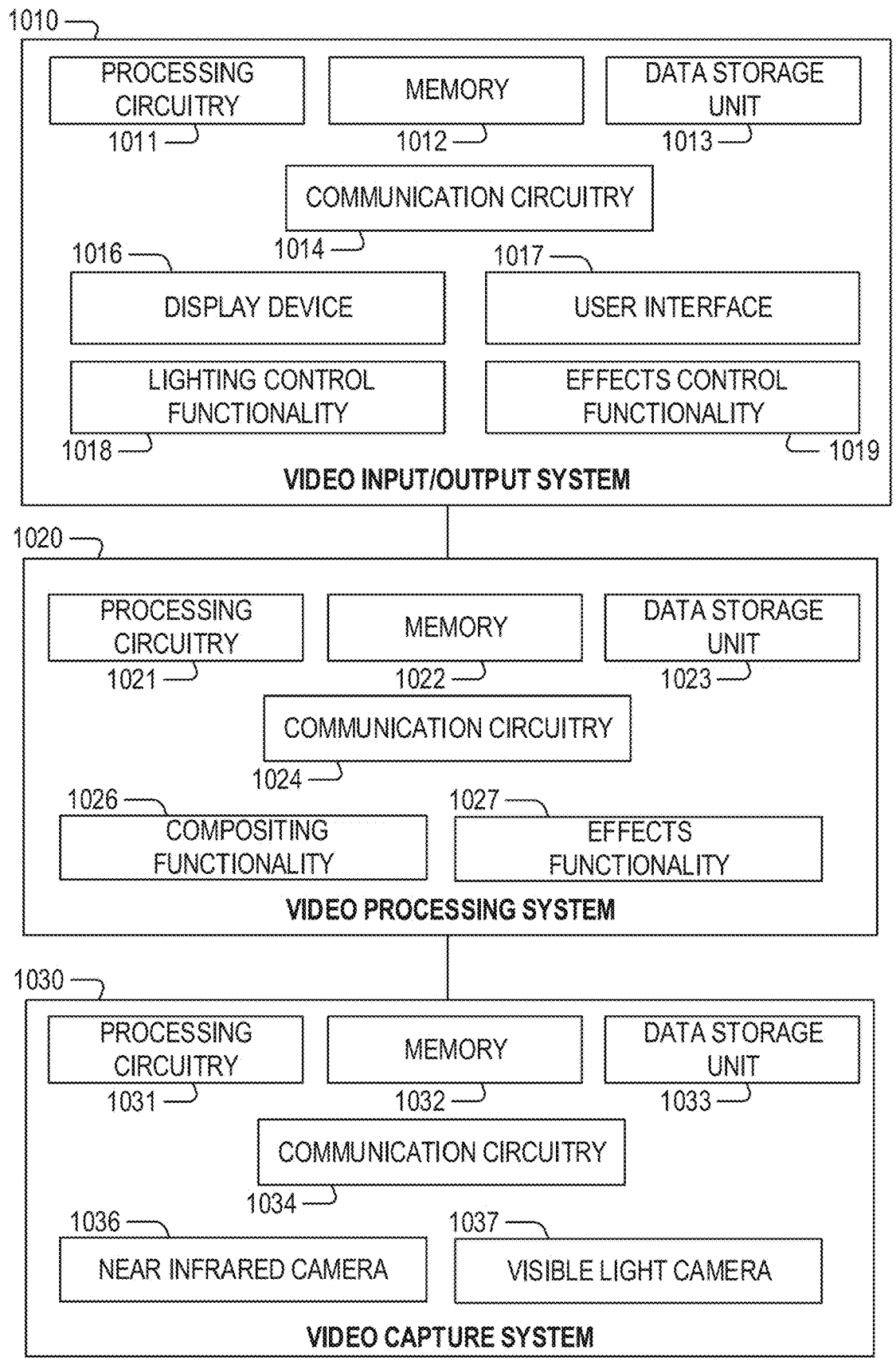
FIG. 10 is a block diagram of example processing components and subsystems operable for video compositing based on near-infrared video, according to various examples.

FIG. 10 illustrates a block diagram of example processing components and subsystems operable for video compositing based on NIR video, based on the techniques described herein. For example, a series of systems, including a video input/output system 1010, a video processing system 1020, and a video capture system 1030, may be operably coupled and deployed in a video capture environment such as with the environments depicted in FIGS. 1 to 6 and with the techniques described in FIGS. 7 to 9. For instance, the video capture system 1030 may embody features of the dual camera system 300; the video input/output system 1010 may embody features of the teleprompter video display system 200 or the video projection system 400; the video processing system may embody a computer system adapted to perform or control the functionality of the flowcharts 700, 800, 900.

The video input/output system 1010, the video processing system 1020, and the video capture system 1030 may include respective hardware components, such as processing circuitry 1011, 1021, 1031 to execute instructions, memory 1012, 1022, 1032 used with the processing circuitry to execute instructions and provide data, data storage 1013, 1023, 1033 to host and store instructions and data, and networking circuitry 1014, 1024, 1034 to communicate (e.g., receive and transmit) data among systems via a network. The hardware components may operate with use of further hardware and software-implemented components (not depicted) located among the systems 1010, 1020, 1030 for user input, output, and processing, such as aspects of a graphical user interface, output devices (such as to provide output of the graphical user interface) and input devices (such as to provide input for processing and actions in the graphical user interface).

In an example, the video input/output system 1010 is a controllable system configured to implement data viewing and capture operations for obtaining NIR matte and formatted video data. For instance, in the context of the immersive video environment described herein (e.g., as depicted in FIGS. 2A-2E), the video input/output system may control numerous electrical components (e.g., lights, video screens, audio outputs, environment special effects). As referenced throughout this disclosure, the configuration and use of the immersive video environment may be adapted according to the human users or objects within the environment, the selected video or image backgrounds, the selected special effects in the environment or for the video or image, and the like. Thus, it will be understood that the control and performance capabilities of the video input/output system 1010 may vary depending on the deployed performance environment, the controllable devices within such environment, and the use of the controllable devices and settings within such environment.

In an example, the video input/output system 1010 may include a display device 1016 for outputting real-time video and video special effects (e.g., produced from the video processing system 1020), and a user interface 1017 for providing inputs for control or changes of the real-time video and the video special effects (e.g., to effect control of features of the video processing system 1020 or the video capture system 1030). The video input/output system 1010 also may include components (e.g., programmed or specially arranged circuitry) for implementing environmental control features, such as through: lighting control functionality 1018 that implements and executes lighting scenarios and settings among lighting devices (e.g., by controlling lights 124, 130); effects control functionality 1019 that implements and executes effect outputs in the environment (e.g., by controlling connected video, audio, or special effects devices within the environment of the interactive stage structure 150). In an example, aspects of the functionality 1018, 1019 may be scripted or automated to implement automatic settings for particular video use cases. In a further example, an output device and an input device (not depicted) are used to engage the user interface 1017 with use of the processing circuitry 1011 and memory 1012, to implement user-defined settings for features of the lighting control functionality 1018 and the effects control functionality 1019.

In addition to previously described features and functionality, the video processing system 1020 is depicted as compositing functionality 1026 and effects functionality 1027. In an example, the compositing functionality 1026 is adapted to process camera video streams (e.g., camera feeds 760, 765) from a NIR/Visible camera system (e.g., dual camera system 300), and create a matte (e.g., luma matte 780) and generate output image and video (e.g., image with alpha channel 785) from the two respective video streams. The effects functionality 1027 is also adapted to implement post-processing video effects on all or a portion of the video streams (e.g., with the addition of additional video objects or layers, the distortion of colors, shapes, or perspectives in the video, and any other number of other video changes). In a further example, the video processing system 1020 may operate as a server, to receive and process video data obtained from the video capture system 1030, and to serve video data output to the video input/output system 1010.

In addition to previously described features and functionality, the video capture system 1030 may include components of a dual camera system, such as a near-infrared camera 1036 and a visible light camera 1037. In an example, the near-infrared camera 1036 includes a sensor to detect NIR light (e.g., emitted in the interactive stage structure 150 environment from IR light emitters 124) and produce a NIR video stream, while the visible light camera includes a sensor to detect visible light (e.g., emitted in the interactive stage structure 150 environment from a visible light source such as lights 130) and produce a RGB video stream. The respective video streams are then communicated to the video processing system 1020 for compositing and video effects. In further examples, functionality (not depicted) may provide pre-processing and adjustments of the video stream(s) before communication to the video processing system 1020 or the video input/output system 1030. Further, raw or pre-processed captured video data may be communicated to the video processing system 1020 and the video input/output system 1010 in real time, in a delayed fashion, or upon demand.

In an example, the features of the various systems 1010, 1020, 1030 may be integrated or combined into a single system, device, or sub-system. In other examples, the features of the various systems 1010, 1020, 1030 may be distributed among multiple computing machines, including in scenarios involving the use of external (e.g., remote, network-connected) video processing systems. Other variations to implement the video compositing and effects may be implemented by additional hardware provided within the systems 1010, 1020, 1030, and an accompanying use environment (e.g., within interactive stage structure 150).

The components, methods, applications, and so forth described in conjunction with FIGS. 7-9 (and deployed in the examples set forth for FIGS. 1-6 and 10) are implemented in some embodiments in the context of a machine and an associated software architecture for video processing. The paragraphs below describe representative software architecture(s) and machine (e.g., hardware) architecture(s) suitable for use with the disclosed embodiments. For example, software architectures may be used in conjunction with hardware architectures to create devices and machines tailored to particular purposes. For example, a hardware architecture coupled with a software architecture may create a video processing device or like graphical output device. Not all combinations of such software and hardware architectures are presented here, as those of skill in the art can readily understand how to implement the disclosed subject matter in different contexts from the disclosure contained herein.

Figure 11:
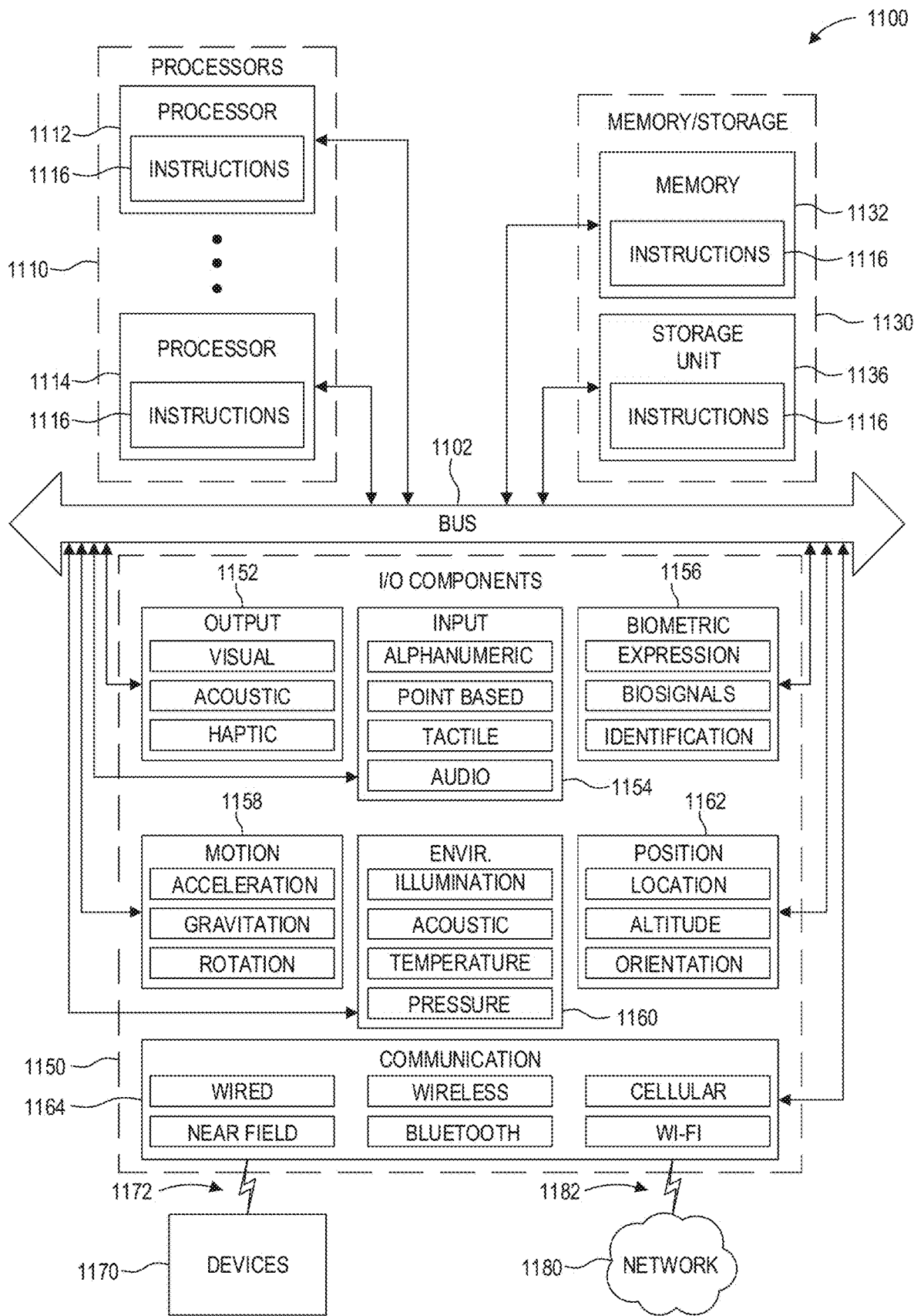
FIG. 11 is a block diagram of a machine in the example form of an electronic computing system within which a set of instructions, for causing the machine to perform any one or more of the methodologies discussed herein, may be executed.

FIG. 11 is a block diagram illustrating components of a machine 1100, according to some example embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. The instructions 1116 transform the machine into a machine programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, PC, a tablet PC, a hybrid tablet, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 may include processors 1110, memory/storage 1130, and I/O components 1150, which may be configured to communicate with each other such as via a bus 1102. In an example, the processors 1110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1112 and a processor 1114 that may execute the instructions 1116. In an example, a processor includes multi-core processors that may comprise two or more independent processors (sometimes referred to as "cores") that may execute instructions contemporaneously. Although FIG. 11 shows multiple processors 1110, the machine 1100 may include a single processor with a single core, a single processor with multiple cores (e.g., a multi-core processor), multiple processors with a single core, multiple processors with multiples cores, or any combination thereof.

The memory/storage 1130 may include a memory 1132, such as a main memory, or other memory storage, and a storage unit 1136, both accessible to the processors 1110 such as via the bus 1102. The storage unit 1136 and memory 1132 store the instructions 1116 embodying any one or more of the methodologies or functions described herein. The instructions 1116 may also reside, completely or partially, within the memory 1132, within the storage unit 1136, within at least one of the processors 1110 (e.g., within the processor's cache memory), or any suitable combination thereof, during execution thereof by the machine 1100. Accordingly, the memory 1132, the storage unit 1136, and the memory of the processors 1110 are examples of machine-readable media.

A machine-readable medium includes a device able to store instructions (e.g., instructions 1116) and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. Thus, a machine-readable medium may include a single medium or multiple media (e.g., a centralized or distributed database, or associated caches and servers) able to store the instructions 1116. A machine-readable medium may also include medium, or combination of multiple media, that is capable of storing instructions (e.g., instructions 1116, stored in a non-transitory manner) for execution by a machine (e.g., machine 1100), such that the instructions, when executed by one or more processors of the machine (e.g., processors 1110), cause the machine to perform any one or more of the methodologies described herein. Accordingly, a machine-readable medium refers to a single storage apparatus or device, as well as "cloud-based" storage systems or storage networks that include multiple storage apparatus or devices.

The I/O components 1150 may include a wide variety of components to receive input, provide output, produce output, transmit information, exchange information, capture measurements, and the like. The specific I/O components 1150 that are included in a particular machine will depend on the type of machine. For example, portable machines such as mobile phones may include a touch input device or other such input mechanisms, while a headless server machine will likely not include such a touch input device. It will be understood that the I/O components 1150 may include many other components that are not shown in FIG. 11. The I/O components 1150 are grouped according to functionality merely for simplifying the following discussion, as the illustrated grouping is not intended to be limiting. Various components of the following I/O components 1150 may be used, for example, in connection with bot-human interaction features in connection with the bots discussed herein.

In various examples, the I/O components 1150 may include output components 1152 and input components 1154. The output components 1152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1154 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1150 may include biometric components 1156, motion components 1158, environmental components 1160, or position components 1162, among a wide array of other components. For example, the biometric components 1156 may include components to detect expressions (e.g., hand expressions, facial expressions, vocal expressions, body gestures, or eye tracking), measure bio signals (e.g., blood pressure, heart rate, body temperature, perspiration, or brain waves), measure exercise-related metrics (e.g., distance moved, speed of movement, or time spent exercising) identify a person (e.g., voice identification, retinal identification, facial identification, fingerprint identification, or electroencephalogram based identification), and the like. The motion components 1158 may include acceleration sensor components (e.g., accelerometer), gravitation sensor components, rotation sensor components (e.g., gyroscope), and so forth. The environmental components 1160 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1162 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 may include a network interface component or other suitable device to interface with the network 1180. In further examples, the communication components 1164 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1170 may be another machine or any of a wide variety of peripheral devices (e.g., a peripheral device coupled via a USB).

Moreover, the communication components 1164 may detect identifiers or include components operable to detect identifiers. For example, the communication components 1164 may include Radio Frequency Identification (RFID) tag reader components, NFC smart tag detection components, optical reader components, or acoustic detection components (e.g., microphones to identify tagged audio signals). In addition, a variety of information may be derived via the communication components 1164, such as location via Internet Protocol (IP) geolocation, location via Wi-Fi® signal triangulation, location via detecting an NFC beacon signal that may indicate a particular location, and so forth.

In various examples, one or more portions of the network 1180 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a IEEE 802.11 Wi-Fi® network, another type of network, or a combination of two or more such networks. For example, the network 1180 or a portion of the network 1180 may include a wireless or cellular network and the coupling 1182 may be a Code Division Multiple Access (CDMA) connection, a Global System for Mobile communications (GSM) connection, third Generation Partnership Project (3GPP) connection such as via a fourth generation (4G) or fifth generation (5G) wireless network, or another type of cellular or wireless coupling. In this example, the coupling 1182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, Universal Mobile Telecommunications System (UMTS), High Speed Packet Access (HSPA), Long Term Evolution/Long Term Evolution-Advanced (LTE/LTE-A), Worldwide Interoperability for Microwave Access (WiMAX), including standards of such protocols, communication protocols defined by various standard-setting organizations, other long range protocols, or other data transfer technology.

The instructions 1116 may be transmitted or received over the network 1180 using a transmission medium via a network interface device (e.g., a network interface component included in the communication components 1164) and utilizing any one of a number of well-known transfer protocols (e.g., HTTP). Similarly, the instructions 1116 may be transmitted or received using a transmission medium via the coupling 1172 (e.g., a peer-to-peer coupling) to the devices 1170. Thus, a transmission medium may include any intangible medium that is capable of storing, encoding, or carrying the instructions 1116 for execution by the machine 1100, and includes digital or analog communications signals or other intangible media to facilitate communication of such software.

The above description is intended to be illustrative, and not restrictive. For example, the above-described examples (or one or more aspects thereof) may be used in combination with others. Other embodiments may be used, such as by one of ordinary skill in the art upon reviewing the above description. In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system comprising:
a camera system including a visible light detection camera and an infrared detection camera, the cameras arranged to capture video from a single capture point to image a performance area;
a visible light source arranged to emit visible light onto the performance area, the visible light to be reflected from the performance area towards the camera system;
an infrared light source arranged to emit infrared light onto the performance area, the infrared light to be emitted through the performance area towards the camera system;
a display source to provide video output; and
a display screen arranged between the camera system and the infrared light source, wherein the display screen is arranged to cause a space for the performance area to be defined between the display screen and the infrared light source, and wherein the display screen is arranged to be viewable within the performance area while a first portion of infrared light originating from the infrared light source is blocked from reaching the infrared detection camera when a human subject is located within the performance area;

wherein the display screen is further arranged to:
permit a second portion of the infrared light originating from the infrared light source to pass through the display screen to the infrared detection camera;
permit the visible light originating from the visible light source and reflected from the performance area to pass through the display screen to the visible light detection camera; and
reflect visible light originating from the display source towards the performance area, wherein the visible light originating from the display source is reflected by the display screen to provide the video output from the display source that is visible in the performance area.

2. The system of claim 1, wherein the visible light detection camera produces RGB video of the human subject in the performance area, for the human subject located between the infrared light source and the display screen within the performance area, and wherein the visible light source is arranged such that the visible light originating from the visible light source reflects off the human subject to be detected by the visible light detection camera.

3. The system of claim 1, further comprising a backdrop, the backdrop including a material that permits the infrared light to pass through the backdrop while blocking visible light.

4. The system of claim 3, wherein the backdrop is arranged between the infrared light source and the performance area, such that infrared light from the infrared light source passes through the backdrop, wherein the first portion of infrared light is blocked by the human subject, and wherein the second portion of the infrared light is not blocked by the human subject and passes through the display screen to be detected by the infrared detection camera.

5. The system of claim 1, wherein the infrared light source includes a plurality of parallel infrared light bars spaced vertically up from a floor of the performance area.

6. The system of claim 1, further comprising a structure surrounding the performance area, the structure arranged to host the display source, the camera system, and the visible light source, and wherein the structure is further arranged such that visible light from outside the structure is prevented from reaching the visible light detection camera of the camera system.

7. The system of claim 1, wherein the visible light originating from the display source and reflected by the display screen provides a real-time video display of the human subject superimposed on a virtual background.

8. The system of claim 7, wherein blocking of the second portion of the infrared light originating from the infrared light source is used to identify a background portion and a foreground portion of the real-time video display, wherein the background portion of the real-time video display is removed as the human subject is superimposed on the virtual background.

9. The system of claim 1, wherein the display source is a monitor, wherein the monitor is arranged to project the visible light originating from the display source onto the display screen, and wherein the monitor and the camera system are hosted by a teleprompter housing.

10. The system of claim 1, wherein the display source is a projector, wherein the projector is arranged to project the visible light onto the display screen, and wherein the projector is arranged between the infrared light source and the display screen.

11. The system of claim 10, wherein the display screen is a microlens array display screen.

12. The system of claim 1, wherein the visible light originating from the visible light source is received at the display screen at an angle to a face of the display screen.

13. The system of claim 1, further comprising:
an audio output device, wherein the audio output device is arranged to output sound to the performance area, and wherein the sound corresponds to the video output from the display source.

14. A method, comprising:
capturing, at an infrared detection camera of a matte camera system, a first portion of infrared light originating from an infrared light source through a display screen arranged between the matte camera system and the infrared light source;
capturing, at a visible light detection camera of the matte camera system, visible light originating from a visible light source and traveling through the display screen, wherein the matte camera system is arranged to capture video for the infrared detection camera and the visible light detection camera from a single capture point into a performance area; and
projecting, from a display source, light onto the display screen, wherein the projection of the light onto the display screen is visible to a human subject in the performance area, wherein the display screen is arranged to cause a space for a performance area to be defined between the display screen and the infrared light source;
wherein a second portion of infrared light originating from the infrared light source is blocked from reaching the infrared detection camera by the human subject in the performance area when the human subject is located within the performance area, wherein the infrared light is emitted through the performance area towards the matte camera system.

15. The method of claim 14, wherein the display source is a monitor, wherein the monitor is arranged to project light onto the display screen, and wherein the monitor and the matte camera system are housed within a teleprompter housing.

16. The method of claim 14, wherein the display source is a projector, wherein the projector is arranged to project the light onto the display screen, and wherein the projector is further arranged between the infrared light source and the display screen.

17. A method, comprising:
capturing, at an infrared detection camera of a matte camera system, an infrared video stream of a first portion of infrared light originating from an infrared light source, wherein the infrared light source transmits the first portion of infrared light to the infrared detection camera through a display screen arranged between the matte camera system and the infrared light source, and wherein the infrared light source emits the infrared light within an enclosed structure;
capturing, at a visible light detection camera of the matte camera system, a visible video stream of visible light originating from a visible light source, wherein the visible light source emits the visible light within the enclosed structure, and wherein the visible light is received through the display screen, wherein the matte camera system is arranged to capture video for the infrared detection camera and the visible light detection camera from a single capture point into a performance area located within the enclosed structure;

determining a background portion of the visible video stream corresponding to an area surrounding the first portion of infrared light in the infrared video stream, wherein the area surrounding the first portion of infrared light corresponds to a second portion of the infrared light that is blocked by an object within the performance area of the enclosed structure as infrared light is emitted through the performance area towards the matte camera system, and wherein the display screen is arranged to cause a space for the performance area to be defined between the display screen and the infrared light source;

removing the background portion of the visible video stream;

generating a real-time video including a real-time video capture of the object from the visible video stream and a virtual background replacing the removed background portion; and projecting, from a display source, the real-time video reflected off the display screen, wherein the real-time video is visible within the enclosed structure from a perspective of the object.

18. The method of claim 17, wherein the display source is a monitor, wherein the monitor is adapted to project visible light representing the real-time video onto the display screen, wherein the monitor and the matte camera system are housed by a teleprompter housing, and wherein the teleprompter housing is positioned within the enclosed structure to allow viewing by a human located within the enclosed structure.

19. The method of claim 17, wherein the display source is a visible light projector, the visible light projector to project the real-time video onto the display screen, wherein the visible light projector is arranged between the infrared light source and the display screen, and wherein the display screen is positioned within the enclosed structure to allow viewing by a human located within the performance area of the enclosed structure.

20. The method of claim 14, wherein the infrared light source includes a plurality of parallel infrared light bars spaced vertically up from a floor of the performance area.

* * * * *